United States Patent
Chang et al.

(10) Patent No.: US 12,066,682 B2
(45) Date of Patent: *Aug. 20, 2024

(54) IMAGING LENS SYSTEM, CAMERA MODULE AND ELECTRONIC DEVICE

(71) Applicant: LARGAN PRECISION CO., LTD., Taichung (TW)

(72) Inventors: Ming-Shun Chang, Taichung (TW); Heng Yi Su, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,198

(22) Filed: Dec. 27, 2022

(65) Prior Publication Data

US 2023/0126553 A1  Apr. 27, 2023

Related U.S. Application Data

(63) Continuation of application No. 16/686,125, filed on Nov. 16, 2019, now Pat. No. 11,573,400.

(30) Foreign Application Priority Data

Sep. 17, 2019 (TW) ................................. 108133413

(51) Int. Cl.
  *G02B 3/04*   (2006.01)
  *G02B 7/02*   (2021.01)
  *G03B 9/54*   (2021.01)

(52) U.S. Cl.
  CPC ............... *G02B 7/021* (2013.01); *G02B 3/04* (2013.01); *G03B 9/54* (2013.01)

(58) Field of Classification Search
  CPC .................................. G02B 3/04; G02B 7/021
  See application file for complete search history.

(56) References Cited

U.S. PATENT DOCUMENTS

| 7,349,161 | B1 | 3/2008 | Shyu et al. |
| 7,540,982 | B2 | 6/2009 | Shyu et al. |

(Continued)

FOREIGN PATENT DOCUMENTS

| CN | 100370300 | 2/2008 |
| CN | 101685185 A | 3/2010 |

(Continued)

OTHER PUBLICATIONS

Taiwan Office Action in Application No. 108133413 dated Mar. 26, 2020.

(Continued)

*Primary Examiner* — Wen Huang
(74) *Attorney, Agent, or Firm* — Maschoff Brennan

(57) ABSTRACT

An imaging lens system includes a plastic lens element. The plastic lens element includes an optical effective portion and an outer ring portion. The optical axis passes through the optical effective portion. The outer ring portion surrounds the optical effective portion and includes an annular groove structure, a conical surface, a flat abutting portion and a full-circle connecting portion. The annular groove structure is tapered off. Each of the conical surface and the flat abutting portion is located closer to the optical effective portion than the annular groove structure. The flat abutting portion is in physical contact with an optical element. The full-circle connecting portion is connected to the annular groove structure and located farther away from the optical effective portion than the annular groove structure. The annular groove structure has an annular bottom end surface extending in a direction substantially perpendicular to the optical axis.

19 Claims, 26 Drawing Sheets

(56) References Cited

U.S. PATENT DOCUMENTS

| | | | |
|---|---|---|---|
| 7,830,610 | B2 | 11/2010 | Nishizawa et al. |
| 8,169,721 | B2 | 5/2012 | Lin et al. |
| 8,619,371 | B2 | 12/2013 | Fujino et al. |
| 8,842,376 | B2 | 9/2014 | Yang et al. |
| 10,054,756 | B2 | 8/2018 | Wei |
| 10,185,114 | B2 | 1/2019 | Ito |
| 2012/0218649 | A1 | 8/2012 | Konishi |
| 2015/0241656 | A1 | 8/2015 | Choi |
| 2017/0003749 | A1 | 1/2017 | Wei |
| 2018/0292626 | A1 | 10/2018 | Chou |
| 2020/0073077 | A1 | 3/2020 | Kanzaki |
| 2020/0409021 | A1 | 12/2020 | Wang |

FOREIGN PATENT DOCUMENTS

| | | |
|---|---|---|
| CN | 102486545 | 6/2012 |
| CN | 103370182 | 10/2015 |
| CN | 103443857 B | 7/2016 |
| CN | 106888343 A | 6/2017 |
| CN | 108061955 A | 5/2018 |
| CN | 109425917 A | 3/2019 |
| CN | 109541779 A | 3/2019 |
| CN | 110109226 A | 8/2019 |
| CN | 210954387 U | 7/2020 |

OTHER PUBLICATIONS

Indian Examination Report dated Jun. 25, 2021 as received in application No. 202034003432.
Chinese Office Action dated Apr. 25, 2022 as received in application No. 201911269217.1.

IMAGING LENS SYSTEM, CAMERA MODULE AND ELECTRONIC DEVICE

RELATED APPLICATIONS

This application is a continuation patent application of U.S. application Ser. No. 16/686,125 filed on Nov. 16, 2019, which claims priority to Taiwan Application 108133413, filed on Sep. 17, 2019, which is incorporated by reference herein in its entirety.

BACKGROUND

Technical Field

The present disclosure relates to an imaging lens system, a camera module and an electronic device, more particularly to an imaging lens system and a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

A conventional lens assembly usually includes injection molded plastic lens elements, which not only reduces manufacturing costs, but also increases shape design flexibility of the lens surface to meet various requirements. However, in the process of injection molding, there may be some problems existing in the plastic lens elements such as insufficient flatness on the assembly surface structure or insufficient coaxiality on the geometric structure. Accordingly, how to improve the structure of the injection molded plastic lens element is an important topic in the field nowadays.

SUMMARY

According to one aspect of the present disclosure, an imaging lens system has an optical axis and includes at least one plastic lens element. The at least one plastic lens element includes, in order from a center to a periphery thereof, an optical effective portion and an outer ring portion. The optical axis passes through the optical effective portion. The outer ring portion surrounds the optical effective portion. The outer ring portion includes at least one annular groove structure, at least one conical surface, at least one flat abutting portion and at least one full-circle connecting portion on at least one of an object side and an image side thereof.

The at least one annular groove structure is in a full-circle form, and is tapered off from the object side to the image side of the outer ring portion or from the image side to the object side of the outer ring portion. The at least one annular groove structure has an annular bottom end surface extending in a direction substantially perpendicular to the optical axis. The at least one conical surface is located closer to the optical effective portion than the at least one annular groove structure. The at least one flat abutting portion is located closer to the optical effective portion than the at least one annular groove structure, and is in physical contact with an optical element which is adjacent to the at least one plastic lens element of the imaging lens system. The at least one full-circle connecting portion is connected to the at least one annular groove structure, is located farther away from the optical effective portion than the at least one annular groove structure, and defines a depth of the at least one annular groove structure.

When a first distance in parallel with the optical axis between the at least one full-circle connecting portion and the annular bottom end surface is d, the following condition is satisfied:

$$0.005 \text{ [mm]} \leq d < 0.2 \text{ [mm]}.$$

According to another aspect of the present disclosure, an imaging lens system has an optical axis and includes at least one optical element. The at least one optical element includes, in order from a center to a periphery thereof, a central portion and an outer ring portion. The optical axis passes through the central portion. The outer ring portion surrounds the central portion. The outer ring portion includes at least one annular groove structure, at least one conical surface, at least one flat abutting portion and at least one full-circle connecting portion on at least one of an object side and an image side thereof.

The at least one annular groove structure is in a full-circle form, and is tapered off from the object side to the image side of the outer ring portion or from the image side to the object side of the outer ring portion. The at least one annular groove structure has an annular bottom end surface, a first annular side wall and a second annular side wall. The annular bottom end surface extends in a direction substantially perpendicular to the optical axis. The first annular side wall is connected to the annular bottom end surface and the at least one full-circle connecting portion, and extends in a direction away from the annular bottom end surface. The second annular side wall is connected to the annular bottom end surface, is located closer to the central portion than the annular bottom end surface, and extends in a direction away from the annular bottom end surface.

The at least one conical surface is located closer to the central portion than the at least one annular groove structure. The at least one flat abutting portion is located closer to the central portion than the at least one annular groove structure, and is in physical contact with another optical element which is adjacent to the at least one optical element of the imaging lens system. The at least one full-circle connecting portion is connected to the at least one annular groove structure, and is located farther away from the central portion than the at least one annular groove structure.

When a minimum diameter of the first annular side wall is $\phi A1$, a maximum diameter of the second annular side wall is $\phi A2$, and a length of the annular bottom end surface in a direction perpendicular to the optical axis is $(\phi A1 - \phi A2)/2$, the following condition is satisfied:

$$0.005 \text{ [mm]} \leq (\phi A1 - \phi A2)/2 < 0.2 \text{ [mm]}.$$

According to another aspect of the present disclosure, an imaging lens system has an optical axis and includes at least one plastic lens element. The at least one plastic lens element includes, in order from a center to a periphery thereof, an optical effective portion and an outer ring portion. The optical axis passes through the optical effective portion. The outer ring portion surrounds the optical effective portion. The outer ring portion includes at least one annular groove structure and at least one full-circle connecting portion on at least one of an object side and an image side thereof.

The at least one annular groove structure is in a full-circle form, and is tapered off from the object side to the image side of the outer ring portion or from the image side to the object side of the outer ring portion. The at least one annular groove structure has at least one annular bottom end surface and at least one annular top end surface. The annular bottom end surface extends in a direction substantially perpendicular to the optical axis. The annular top end surface extends in a direction substantially perpendicular to the optical axis. The at least one full-circle connecting portion is connected to the at least one annular groove structure, and is located farther away from the optical effective portion than the at least one annular groove structure.

The outer ring portion of the at least one plastic lens element has a gate trace. The gate trace is located farther away from the optical effective portion than the at least one annular groove structure, and is located farther away from the optical effective portion than the at least one full-circle connecting portion.

According to another aspect of the present disclosure, a camera module includes one of the aforementioned imaging lens systems and an image sensor, wherein the image sensor is disposed on an image surface of the imaging lens system.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
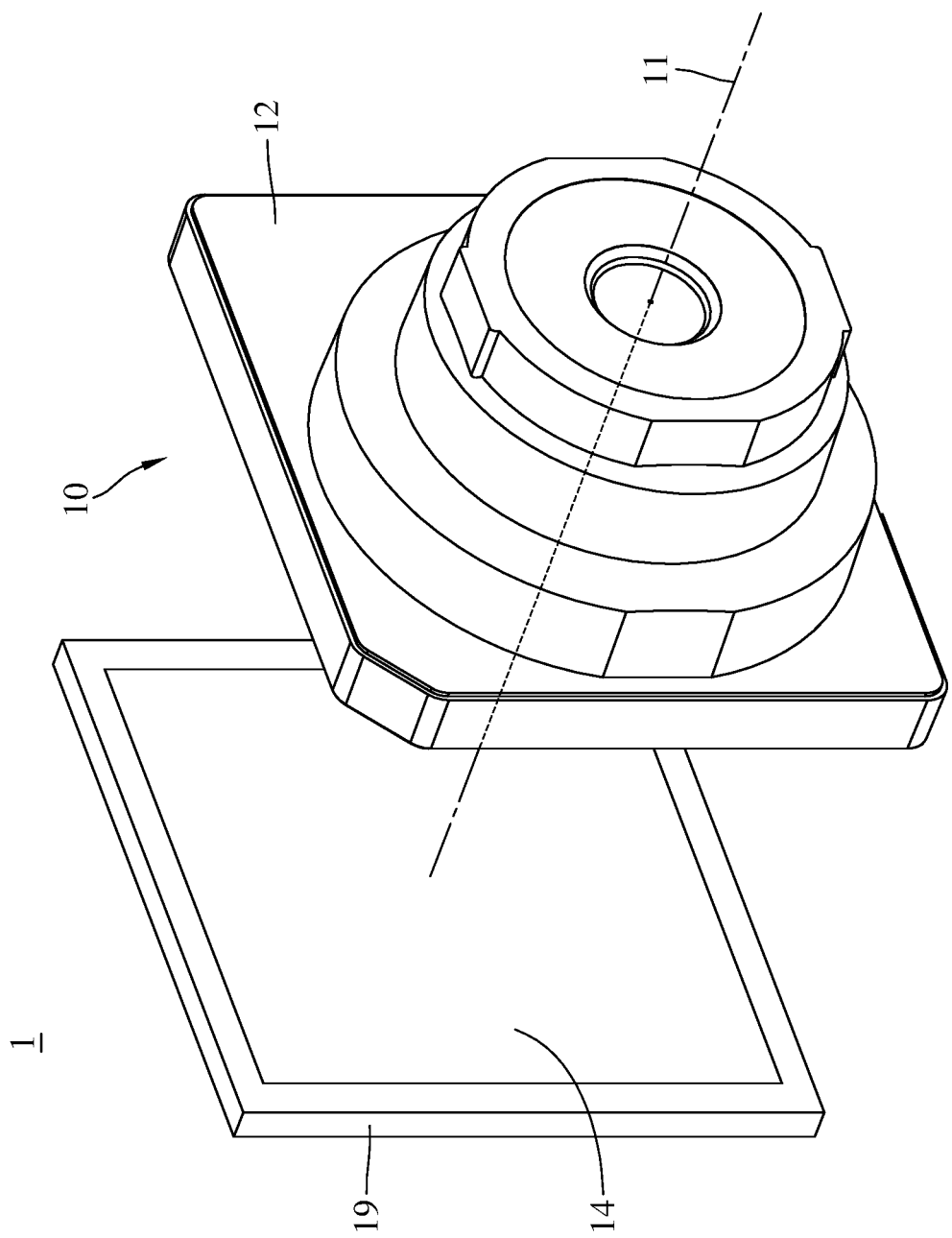
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens system having an optical axis and including at least one plastic lens element.

The at least one plastic lens element includes, in order from a center to a periphery thereof, an optical effective portion and an outer ring portion. The optical axis passes through the optical effective portion. The outer ring portion surrounds the optical effective portion. The outer ring portion includes at least one annular groove structure, at least one conical surface, at least one flat abutting portion and at least one full-circle connecting portion on at least one of an object side and an image side thereof.

The at least one annular groove structure is in a full-circle form, and is tapered off from the object side to the image side of the outer ring portion or from the image side to the object side of the outer ring portion. The so-called full-circle form means that the annular groove structure continuously surrounds the optical effective portion. The so-called being tapered off means that the annular groove structure can have a taper. Generally, if the plastic lens element involves mold release, the annular groove structure can have a taper which ranges from 0 to 5 degrees which can be considered as a release angle thereof. Therefore, it is favorable for reducing the mold release resistance when the injection molded plastic lens element is released from the mold, so as to increase the quality consistency of the plastic lens element in manufacturing, thereby solving the problem of insufficient flatness of the assembly abutting surface of the plastic lens element in injection molding; also, the tapered form of the annular groove structure is favorable for preventing the plastic lens element from interfering with the mold.

The at least one annular groove structure has an annular bottom end surface extending in a direction substantially perpendicular to the optical axis. The so-called substantially perpendicular means that the angle between the annular bottom end surface and the optical axis can be 90 degrees having a tolerance of 10 degrees. Moreover, the angle between the annular bottom end surface and the optical axis can also be 90 degrees having a tolerance of 5 degrees. However, the range of the angle is not intended to restrict the present disclosure. The angle of 90 degrees can be considered as another release angle of the annular groove structure, and the tolerance of the angle can be adjustable for the release requirement in the manufacturing process, wherein the tolerance generally has a frequently used range from 0 to 5 degrees.

The at least one conical surface is located closer to the optical effective portion than the annular groove structure. The at least one flat abutting portion is located closer to the optical effective portion than the annular groove structure, and is in physical contact with an optical element which is adjacent to the plastic lens element of the imaging lens system. The optical element can be another plastic lens element, an optical shutter plate, a retainer or a spacer. The at least one full-circle connecting portion is connected to the annular groove structure, is located farther away from the optical effective portion than the annular groove structure, and defines a depth of the annular groove structure.

The at least one plastic lens element can be correspondingly assembled with the optical element by the conical surface so as to be aligned with the optical axis. Specifically, the optical element can have a conical surface corresponding to the conical surface of the plastic lens element, allowing the plastic lens element and the optical element can be coaxially assembled to each other. Moreover, the conical surface and the flat abutting portion of the plastic lens element can be connected to each other so as to form an axial connection structure for assembling the optical element and for being aligned with the optical axis. Therefore, it is favorable for increasing the resolution and assembling yield rate of the imaging lens system.

According to the present disclosure, the imaging lens system can further include at least one optical shutter plate. The at least one optical shutter plate can be disposed between the plastic lens element and another plastic lens element adjacent to an image side of the optical shutter plate. The optical shutter plate has an opening being coaxial with the optical axis. Therefore, it is favorable for blocking stray light not on the imaging path so as to improve the imaging quality of the imaging lens system. The plastic lens element adjacent to an object side of the optical shutter plate can have a first conical surface, and the another plastic lens element adjacent to the image side of the optical shutter plate can have a second conical surface. The first conical surface and the second conical surface are correspondingly assembled with each other and form an accommodation space between the plastic lens element and the another plastic lens element, and the optical shutter plate can be disposed in the accommodation space. Therefore, it is favorable for securing the relative position between the optical shutter plate and the plastic lens element so as to reduce assembly tolerances, thereby improving the imaging quality of the imaging lens system.

When a first distance in parallel with the optical axis between the at least one full-circle connecting portion and the annular bottom end surface is d, the following condition is satisfied: 0.005 [mm]≤d<0.2 [mm]. The so-called first distance means the aforementioned depth of the annular groove structure. Therefore, it is favorable for adjusting the design value range of the depth of the annular groove structure so as to improve the flatness of the assembly abutting surface of the plastic lens element. Moreover, the following condition can also be satisfied: 0.01 [mm]≤d<0.13 [mm]. Please refer to FIG. 8, which shows a schematic view of the first distance d of the third lens element 130 according to the 1st embodiment of the present disclosure.

When a second distance in parallel with the optical axis between the flat abutting portion and the annular bottom end surface is D, the following condition can be satisfied: 0.05 [mm]<D<0.4 [mm]. Therefore, it is favorable for adjusting the design value range of the height difference of the annular groove structure so as to improve the flatness of the assembly abutting surface of the plastic lens element. Please refer to FIG. 8, which shows a schematic view of the second distance D of the third lens element 130 according to the 1st embodiment of the present disclosure.

When the first distance in parallel with the optical axis between the at least one full-circle connecting portion and the annular bottom end surface is d, and the second distance in parallel with the optical axis between the flat abutting portion and the annular bottom end surface is D, the following condition can be satisfied: 0.02<d/D<1.0. Therefore, it is favorable for providing a ventilation passage on the outer ring portion of the plastic lens element so as to increase the assembly yield rate. Moreover, a projection of the second distance on the optical axis can have at least one part non-overlapping with a projection of the first distance on the optical axis. The so-called projection of the first distance on the optical axis means a projection of a line between the at least one full-circle connecting portion and the annular bottom end surface on the optical axis, and the so-called projection of the second distance on the optical axis means a projection of a line between the at least one flat abutting portion and the annular bottom end surface on the optical axis. When a third distance in parallel with the optical axis between the flat abutting portion and the full-circle connecting portion is D−d, the following condition can be satisfied: 0 [mm]<D−d<0.39 [mm]. Therefore, it is favorable for further defining the size of the ventilation passage of the plastic lens element so as to ensure that the opening of the ventilation passage faces toward the lens barrel.

When a maximum outer diameter of the at least one optical shutter plate is ϕS, and a minimum diameter of the first conical surface is ϕC', the following condition can be satisfied: ϕS≤ϕC'. Therefore, it is favorable for increasing the assembly yield rate between the optical shutter plate and the plastic lens element so as to better control the vibration degree of the optical shutter plate. Please refer to FIG. 8, which shows a schematic view of the maximum outer diameter ϕS of the optical shutter plate 100c and the minimum diameter ϕC' of the first conical surface 130a according to the 1st embodiment of the present disclosure.

The outer ring portion of the at least one plastic lens element can further have a gate trace. The gate trace is located farther away from the optical effective portion than the annular groove structure, and is located farther away from the optical effective portion than the full-circle connecting portion. Therefore, it is favorable for preventing the annular groove structure from being damaged when cutting the gate trace, such that the annular groove structure keeps in the full-circle form. It is noted that the configuration in the full-circle form, compared to the configuration not in the full-circle form, can better improve the molding quality of the plastic lens element. Please refer to FIG. 7, which shows a schematic view of the gate trace 132b of the outer ring portion 132 of the third lens element 130 according to the 1st embodiment of the present disclosure, wherein the arrow R1 indicates the flow direction of the plastic in molding. It is noted that the plastic lens element with a gate trace is a conventional technique, and it is just simply described in the present specification.

The present disclosure provides another imaging lens system having an optical axis and including at least one optical element. The at least one optical element can be a plastic lens element, a retainer or a spacer.

The at least one optical element includes, in order from a center to a periphery thereof, a central portion and an outer ring portion. The optical axis passes through the central portion. The outer ring portion surrounds the central portion. The outer ring portion includes at least one annular groove structure, at least one conical surface, at least one flat abutting portion and at least one full-circle connecting portion on at least one of an object side and an image side thereof.

The at least one annular groove structure is in a full-circle form, and is tapered off from the object side to the image side of the outer ring portion or from the image side to the object side of the outer ring portion. Therefore, it is favorable for increasing the dimension accuracy and solving the problem of insufficient flatness of the assembly abutting surface of the injection molded optical element; also, the tapered form of the annular groove structure is favorable for preventing the optical element from interfering with the mold.

The at least one annular groove structure has an annular bottom end surface, a first annular side wall and a second annular side wall. The annular bottom end surface extends in a direction substantially perpendicular to the optical axis. The angle between the annular bottom end surface and the optical axis can be considered as a release angle of the annular groove structure, and a tolerance of the angle can be adjustable for the release requirement in the manufacturing process, wherein the tolerance generally has a frequently used range from 0 to 5 degrees. The first annular side wall is connected to the annular bottom end surface and the full-circle connecting portion, and extends in a direction away from the annular bottom end surface. The second annular side wall is connected to the annular bottom end surface, is located closer to the central portion than the annular bottom end surface, and extends in a direction away from the annular bottom end surface.

The at least one conical surface is located closer to the central portion than the annular groove structure, and can also be considered as the aforementioned second annular side wall. The at least one flat abutting portion is located closer to the central portion than the annular groove structure, and is in physical contact with another optical element which is adjacent to the optical element of the imaging lens system. The another optical element can be another plastic lens element, an optical shutter plate, another retainer or another spacer. The at least one full-circle connecting portion is connected to the annular groove structure, and is located farther away from the central portion than the annular groove structure.

The at least one optical element can be correspondingly assembled with a plastic lens element adjacent thereto by the conical surface so as to be aligned with the optical axis. Therefore, it is favorable for increasing the resolution and assembling yield rate of the imaging lens system.

The central portion can further include a central opening structure. The central opening structure has a first tapered surface and a second tapered surface that surround the central portion. The first tapered surface faces an object side and is tapered off towards an image side, and the second tapered surface faces the image side and is tapered off towards the object side. The first tapered surface and the second tapered surface are connected to form a central opening. Therefore, it is favorable for reducing non-imaging light generated by reflection on the central opening.

According to the present disclosure, the imaging lens system can further include at least one optical shutter plate. The at least one optical shutter plate can be disposed between the optical element and the plastic lens element. The optical shutter plate has an opening being coaxial with the optical axis. Therefore, it is favorable for blocking stray light not on the imaging path so as to improve the imaging quality of the imaging lens system.

When a minimum diameter of the first annular side wall is $\phi A1$, a maximum diameter of the second annular side wall is $\phi A2$, and a length of the annular bottom end surface in a direction perpendicular to the optical axis is $(\phi A1-\phi A2)/2$, the following condition is satisfied: $0.005\ [\text{mm}] \leq (\phi A1-\phi A2)/2 < 0.2\ [\text{mm}]$. Therefore, it is favorable for adjusting the design value range of the length of the annular groove structure so as to improve the flatness of the assembly abutting surface of the optical element. Moreover, the following condition can also be satisfied: $0.01\ [\text{mm}] \leq (\phi A1-\phi A2)/2 < 0.17\ [\text{mm}]$. Please refer to FIG. 8, which shows a schematic view of the minimum diameter $\phi A1$ of the first annular side wall 1421*b* and the maximum diameter $\phi A2$ of the second annular side wall 1421*c* according to the 1st embodiment of the present disclosure.

When a maximum outer diameter of the at least one optical element is $\phi L$, the minimum diameter of the first annular side wall is $\phi A1$, the maximum diameter of the second annular side wall is $\phi A2$, and a maximum diameter of the at least one conical surface is $\phi C$, the following condition can be satisfied: $\phi L > \phi A1 > \phi A2 \geq \phi C$. Therefore, it is favorable for defining the relative position of the structure in the outer ring portion so as to reduce the dimension variation of the conical surface. Please refer to FIG. 8, which shows a schematic view of maximum outer diameter $\phi L$ of the fourth lens element 140, the minimum diameter $\phi A1$ of the first annular side wall 1421*b*, the maximum diameter $\phi A2$ of the second annular side wall 1421*c* and the maximum diameter $\phi C$ of the second conical surface 140*a* according to the 1st embodiment of the present disclosure.

When the maximum outer diameter of the at least one optical element is $\phi L$, the minimum diameter of the first annular side wall is $\phi A1$, and the maximum diameter of the second annular side wall is $\phi A2$, the following condition can be satisfied: $1 < [\phi L/(\phi A1-\phi A2)]/\pi^2 < 50$. Therefore, it is favorable for adjusting the proportion between the outer diameter of the optical element and the length of the annular groove structure to be in a proper design range so as to better control the injection speed. Moreover, the following condition can also be satisfied: $3 < [\phi L/(\phi A1-\phi A2)]/\pi^2 < 15$.

The outer ring portion of the at least one optical element can further have a gate trace. The gate trace is located farther away from the central portion than the annular groove structure, and is located farther away from the central portion than the full-circle connecting portion. The gate trace is not in contact with the annular groove structure, but is in contact with the full-circle connecting portion. Therefore, it is favorable for preventing the annular groove structure from being damaged when cutting the gate trace, such that the annular groove structure keeps in the full-circle form. It is noted that the configuration in the full-circle form, compared to the configuration not in the full-circle form, can improve the molding quality of the optical element. Please refer to FIG. 18, which shows a schematic view of the gate trace 3035 of the outer ring portion 303 of the spacer 301*a* according to the 3rd embodiment of the present disclosure, wherein the arrow R2 indicates the flow direction of the plastic in molding.

The present disclosure provides another imaging lens system having an optical axis and including at least one plastic lens element.

The at least one plastic lens element includes, in order from a center to a periphery thereof, an optical effective portion and an outer ring portion. The optical axis passes through the optical effective portion. The outer ring portion surrounds the optical effective portion. The outer ring portion includes at least one annular groove structure and at least one full-circle connecting portion on at least one of an object side and an image side thereof.

The at least one annular groove structure is in a full-circle form, and is tapered off from the object side to the image side of the outer ring portion or from the image side to the object side of the outer ring portion. Therefore, it is favorable for solving the problem of insufficient flatness of the assembly abutting surface of the plastic lens element in injection molding caused by the fixed side and the movable side of the mold both pulling the plastic lens element in opening the mold; also, the tapered form of the annular groove structure is favorable for preventing the plastic lens element from interfering with the mold.

The at least one annular groove structure has at least one annular bottom end surface and at least one annular top end surface. The annular bottom end surface extends in a direction substantially perpendicular to the optical axis. The annular top end surface extends in a direction substantially perpendicular to the optical axis. The angle between the annular bottom end surface and the optical axis can be considered as a release angle of the annular groove structure, and a tolerance of the angle can be adjustable for the release requirement in the manufacturing process, wherein the tolerance generally has a frequently used range from 0 to 5 degrees.

The at least one annular groove structure can further have a first annular side wall and a second annular side wall. The first annular side wall is connected to the annular bottom end surface and the full-circle connecting portion, and extends in a direction away from the annular bottom end surface. The second annular side wall is connected to the annular bottom end surface, is located closer to the optical effective portion than the annular bottom end surface, and extends in a direction away from the annular bottom end surface.

The at least one full-circle connecting portion is connected to the annular groove structure, and is located farther away from the optical effective portion than the annular groove structure.

The outer ring portion of the at least one plastic lens element has a gate trace. The gate trace is located farther away from the optical effective portion than the annular groove structure, and is located farther away from the optical effective portion than the full-circle connecting portion. Therefore, it is favorable for preventing the annular groove structure from being damaged when cutting the gate trace, such that the annular groove structure keeps in the full-circle form. It is noted that the configuration in the full-circle form, compared to the configuration not in the full-circle form, can improve the molding quality of the optical element.

When the number of the at least one annular bottom end surface is Nb, and the number of the at least one annular top end surface is Nt, the following condition can be satisfied: Nb=Nt+1. Therefore, it is favorable for defining the number of the annular groove structure in a proper range so as to meet the quality requirement of the plastic lens element in the manufacturing process.

When a first distance in parallel with the optical axis between the at least one full-circle connecting portion and the at least one annular bottom end surface is d, a minimum diameter of the first annular side wall is $\phi A1$, a maximum diameter of the second annular side wall is $\phi A2$, and a length of the at least one annular bottom end surface in a direction perpendicular to the optical axis is $(\phi A1-\phi A2)/2$, the following condition can be satisfied: $0.2<2d/(\phi A1-\phi A2)<5.0$. Therefore, it is favorable for preventing the annular groove structure from being overly deep and thus ensuring the uniformity of injecting the plastic fluid, and it is also favorable for preventing the annular groove structure from being overly long and shallow and thus ensuring the function of injecting the plastic fluid. Moreover, the following condition can also be satisfied: $0.3<2d/(\phi A1-\phi A2)<3.33$. Therefore, it is favorable for flexibly adjusting the parameter in the manufacturing process of the mold.

The present disclosure provides a camera module including one of the aforementioned imaging lens systems and an image sensor, wherein the image sensor is disposed on an image surface of the imaging lens system.

The present disclosure provides an electronic device including the aforementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
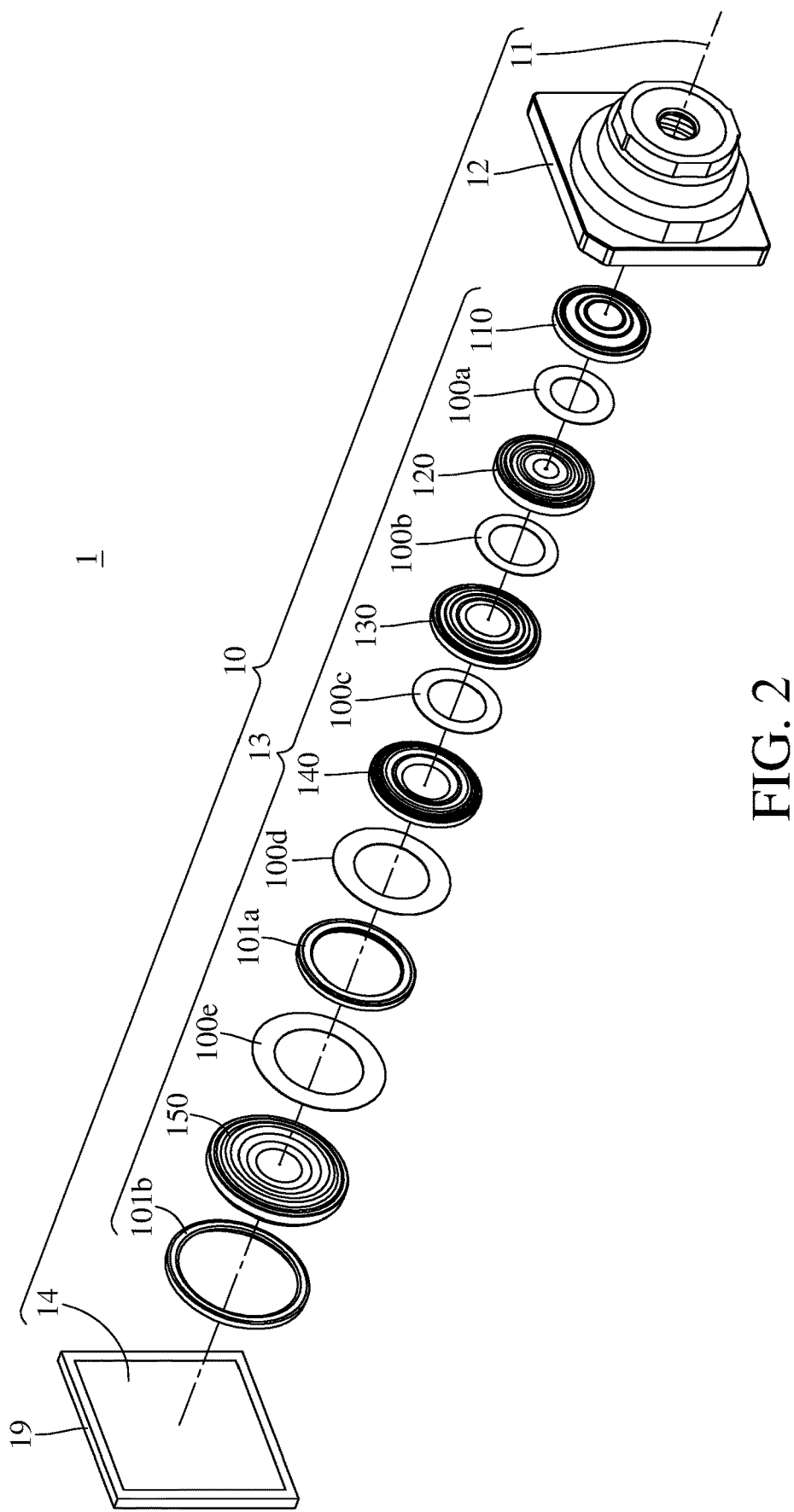
FIG. 2 is an exploded view of the camera module in FIG. 1.
Figure 3:
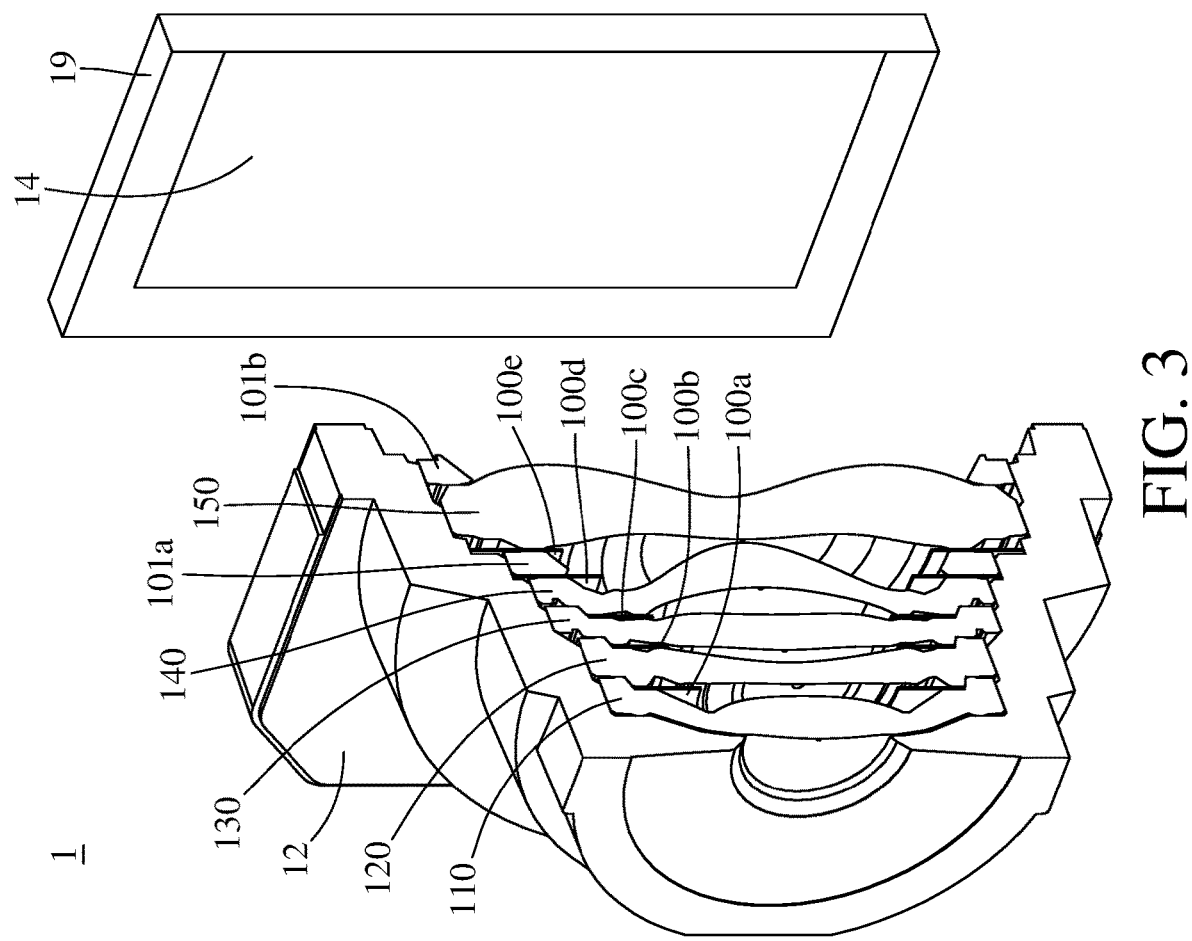
FIG. 3 is another perspective view of the sectioned camera module in FIG. 1.
Figure 4:
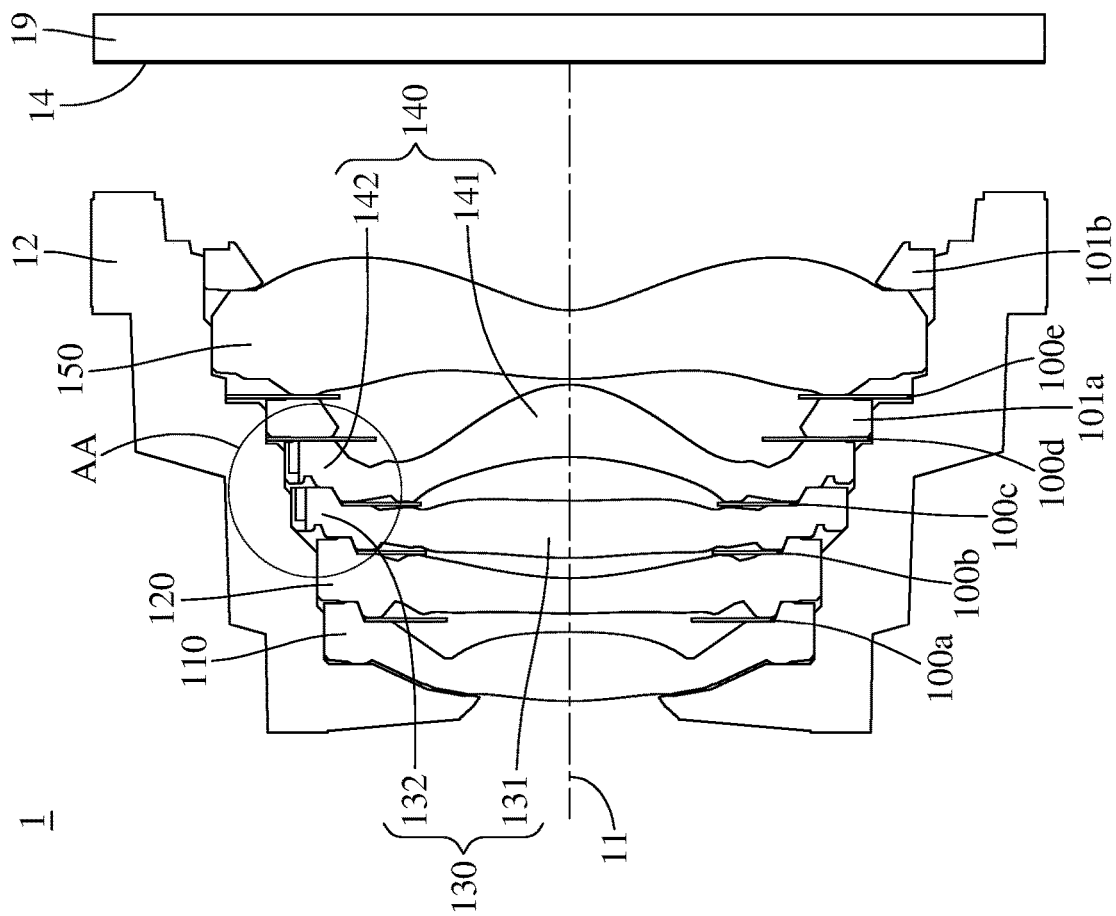
FIG. 4 is a cross-sectional view of the camera module in FIG. 1.
Figure 5:
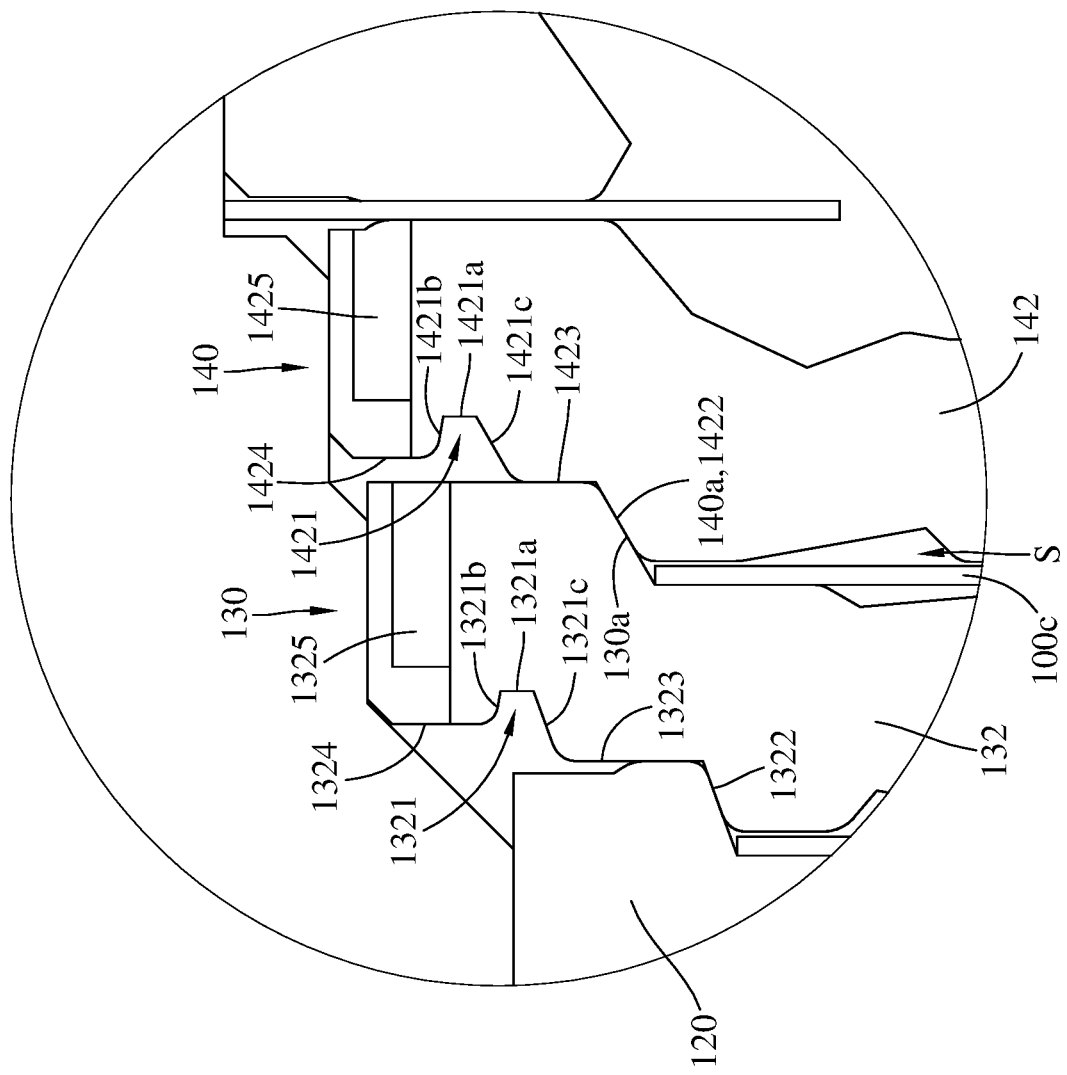
FIG. 5 is an enlarged view of the AA region of the camera module in FIG. 4.
Figure 6:
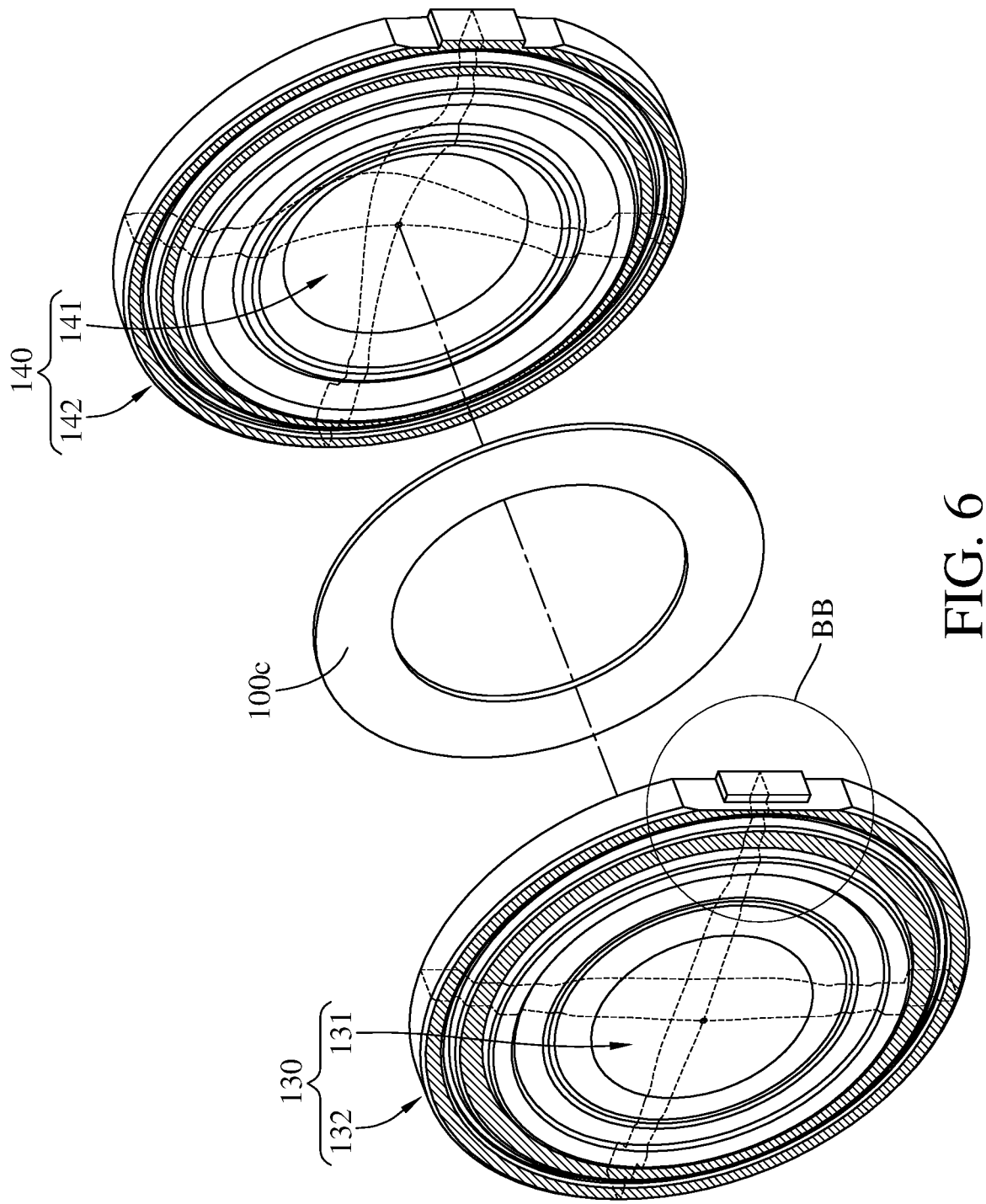
FIG. 6 is an exploded view of the third lens element through the fourth lens element in FIG. 1.
Figure 7:
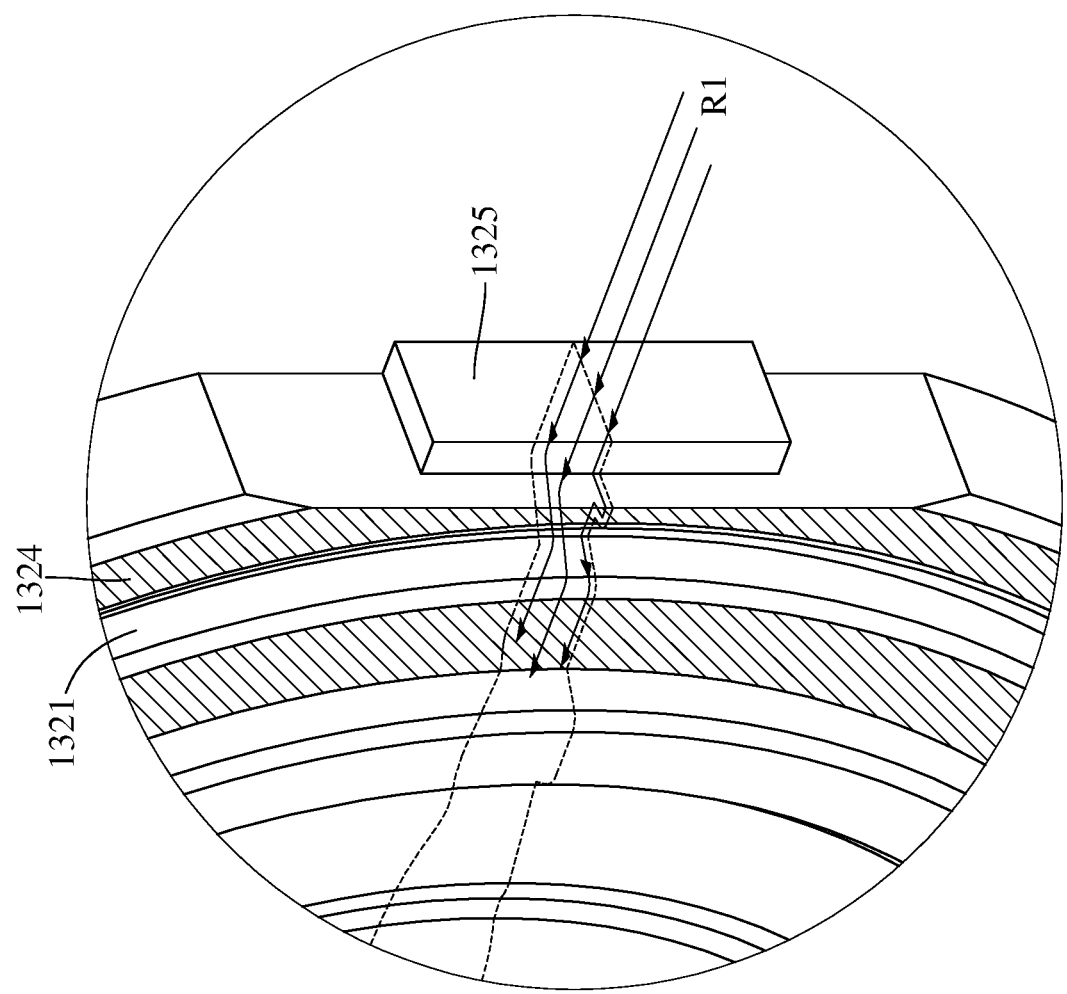
FIG. 7 is an enlarged view of the BB region of the third lens element in FIG. 6.
Figure 8:
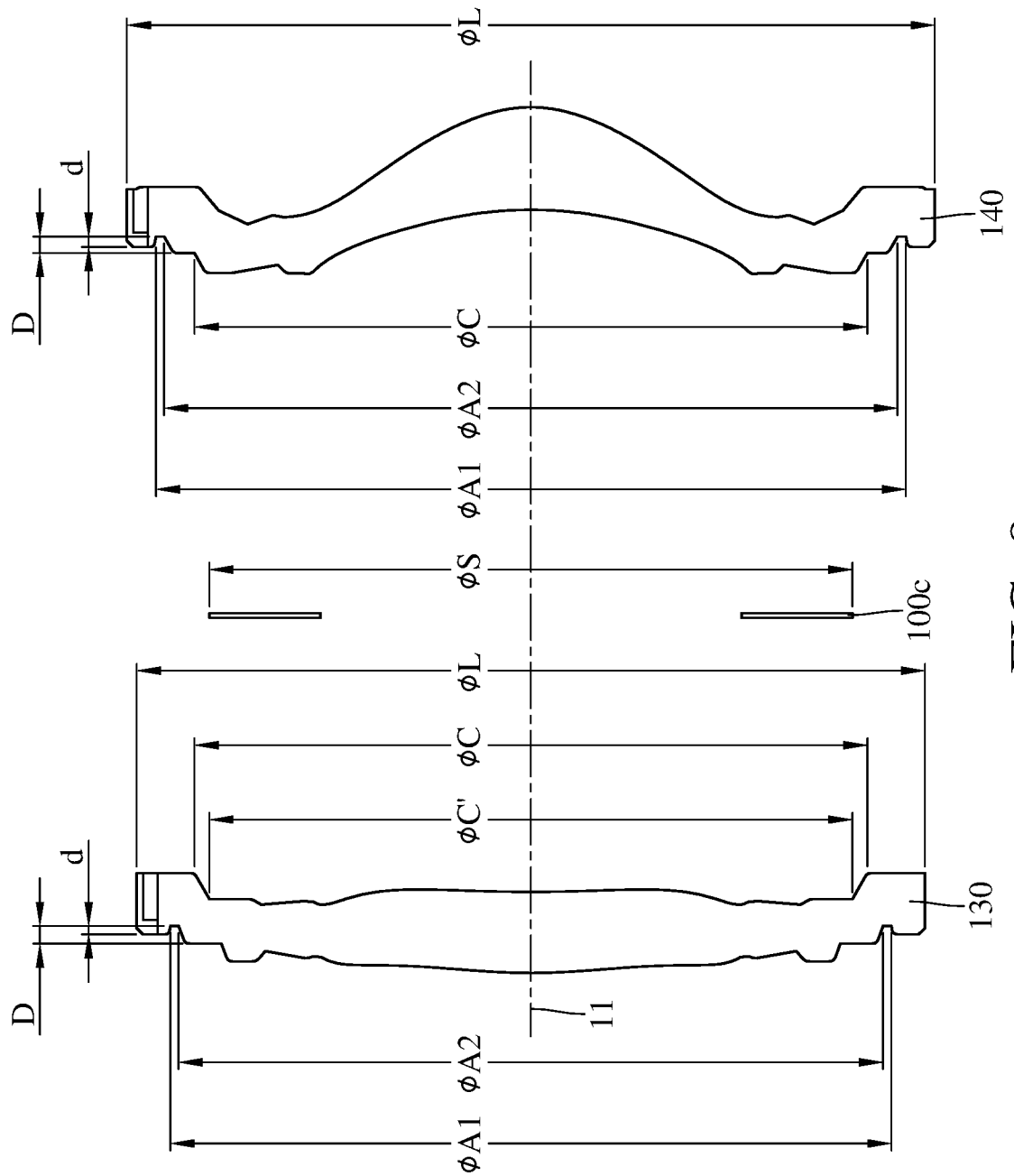
FIG. 8 is an exploded side view of the third lens element through the fourth lens element in FIG. 4.

FIG. 1 is a perspective view of a camera module according to the 1st embodiment of the present disclosure. FIG. 2 is an exploded view of the camera module in FIG. 1. FIG. 3 is another perspective view of the sectioned camera module in FIG. 1. FIG. 4 is a cross-sectional view of the camera module in FIG. 1. FIG. 5 is an enlarged view of the AA region of the camera module in FIG. 4. FIG. 6 is an exploded view of the third lens element through the fourth lens element in FIG. 1. FIG. 7 is an enlarged view of the BB region of the third lens element in FIG. 6. FIG. 8 is an exploded side view of the third lens element through the fourth lens element in FIG. 4.

In this embodiment, a camera module 1 includes an imaging lens system 10 and an image sensor 19. The imaging lens system 10 has an optical axis 11 and includes a lens barrel 12, a plurality of optical elements 13 and an image surface 14. The optical elements 13 are disposed in the lens barrel 12 and include, in order from an object side to an image side, a first lens element 110, an optical shutter plate 100a, a second lens element 120, an optical shutter plate 100b, a third lens element 130, an optical shutter plate 100c, a fourth lens element 140, an optical shutter plate 100d, a spacer 101a, an optical shutter plate 100e, a fifth lens element 150 and a retainer 101b. The third lens element 130 is a plastic lens element, and the fourth lens element 140 is a plastic lens element. The image surface 14 is disposed on an image side of the lens barrel 12. The image sensor 19 is disposed on or near the image surface 14 of the imaging lens system 10.

The optical shutter plates 100a, 100b, 100c, 100d and 100e each have an opening being coaxial with the optical axis 11, and are respectively disposed between the first lens element 110 and the second lens element 120, the second lens element 120 and the third lens element 130, the third lens element 130 and the fourth lens element 140, and the fourth lens element 140 and the fifth lens element 150.

When a maximum outer diameter of the optical shutter plate 100c is $\phi S$, the following condition is satisfied: $\phi S=3.1$ [mm].

The third lens element 130 has a first conical surface 130a, and the fourth lens element 140 has a second conical surface 140a. The first conical surface 130a and the second conical surface 140a are correspondingly assembled with each other and form an accommodation space S between the third lens element 130 and the fourth lens element 140, and the optical shutter plate 100c is disposed in the accommodation space S.

The third lens element 130 includes, in order from a center to a periphery thereof, an optical effective portion 131 and an outer ring portion 132. The optical axis 11 passes through the optical effective portion 131. The outer ring portion 132 surrounds the optical effective portion 131. The outer ring portion 132 includes an annular groove structure 1321, a conical surface 1322, a flat abutting portion 1323 and a full-circle connecting portion 1324 on an object side thereof.

The annular groove structure 1321 is in a full-circle form, and is tapered off from the object side to an image side of the outer ring portion 132. The annular groove structure 1321 has an annular bottom end surface 1321a, a first annular side wall 1321b and a second annular side wall 1321c. The annular bottom end surface 1321a extends in a direction substantially perpendicular to the optical axis 11. The first annular side wall 1321b is connected to the annular bottom end surface 1321a and the full-circle connecting portion 1324, and extends in a direction away from the annular bottom end surface 1321a. The second annular side wall 1321c is connected to the annular bottom end surface 1321a, is located closer to the optical effective portion 131 than the annular bottom end surface 1321a, and extends in a direction away from the annular bottom end surface 1321a.

The conical surface 1322 is located closer to the optical effective portion 131 than the annular groove structure 1321. The third lens element 130 is correspondingly assembled with the second lens element 120 adjacent thereto by the conical surface 1322 so as to be aligned with the optical axis 11.

The flat abutting portion 1323 is located closer to the optical effective portion 131 than the annular groove structure 1321, and is in physical contact with the second lens element 120 adjacent thereto.

The full-circle connecting portion 1324 is connected to the annular groove structure 1321, is located farther away from the optical effective portion 131 than the annular groove structure 1321, and defines a depth of the annular groove structure 1321.

The outer ring portion 132 of the third lens element 130 has a gate trace 1325. The gate trace 1325 is located farther away from the optical effective portion 131 than the annular groove structure 1321, and is located farther away from the optical effective portion 131 than the full-circle connecting portion 1324.

When a maximum outer diameter of the third lens element 130 is $\phi L$, the following condition is satisfied: $\phi L=3.8$ [mm].

When a minimum diameter of the first conical surface 130a is $\phi C'$, the following condition is satisfied: $\phi C'=3.1$ [mm].

When a maximum diameter of the first conical surface 130a is $\phi C$, the following condition is satisfied: $\phi C=3.24$ [mm].

When a minimum diameter of the first annular side wall 1321b is $\phi A1$, the following condition is satisfied: $\phi A1=3.48$ [mm].

When a maximum diameter of the second annular side wall 1321c is $\phi A2$, the following condition is satisfied: $\phi A2=3.4$ [mm].

When the minimum diameter of the first annular side wall 1321b is $\phi A1$, the maximum diameter of the second annular side wall 1321b is $\phi A2$, and a length of the annular bottom end surface 1321a in a direction perpendicular to the optical axis 11 is $(\phi A1-\phi A2)/2$, the following condition is satisfied: $(\phi A1-\phi A2)/2=0.04$ [mm].

When the maximum outer diameter of the third lens element 130 is $\phi L$, the minimum diameter of the first annular side wall 1321b is $\phi A1$, and the maximum diameter of the second annular side wall 1321c is $\phi A2$, the following condition is satisfied: $[\phi L/(\phi A1-\phi A2)]/\pi^2=4.81$.

When a first distance in parallel with the optical axis 11 between the full-circle connecting portion 1324 and the annular bottom end surface 1321a is d, the following condition is satisfied: $d=0.04$ [mm].

When a second distance in parallel with the optical axis 11 between the flat abutting portion 1323 and the annular bottom end surface 1321a is D, the following condition is satisfied: $D=0.09$ [mm].

When the first distance in parallel with the optical axis 11 between the full-circle connecting portion 1324 and the annular bottom end surface 1321a is d, and the second distance in parallel with the optical axis 11 between the flat abutting portion 1323 and the annular bottom end surface 1321a is D, the following condition is satisfied: $d/D=0.44$.

A projection of the second distance D on the optical axis 11 has at least one part non-overlapping with a projection of the first distance d on the optical axis 11. In other word, when a third distance in parallel with the optical axis 11 between the flat abutting portion 1323 and the full-circle connecting portion 1324 is D−d, the following condition is satisfied: $D-d=0.05$ [mm].

When the first distance in parallel with the optical axis 11 between the full-circle connecting portion 1324 and the annular bottom end surface 1321a is d, the minimum diameter of the first annular side wall 1321b is $\phi A1$, the maximum diameter of the second annular side wall 1321c is $\phi A2$, and the length of the annular bottom end surface 1321a in a direction perpendicular to the optical axis 11 is $(\phi A1-\phi A2)/2$, the following condition is satisfied: $2d/(\phi A1-\phi A2)=1.0$.

The fourth lens element 140 includes, in order from a center to a periphery thereof, an optical effective portion 141 and an outer ring portion 142. The optical axis 11 passes through the optical effective portion 141. The outer ring portion 142 surrounds the optical effective portion 141. The outer ring portion 142 includes an annular groove structure 1421, a conical surface 1422, a flat abutting portion 1423 and a full-circle connecting portion 1424 on an object side thereof.

The annular groove structure 1421 is in a full-circle form, and is tapered off from the object side to an image side of the outer ring portion 142. The annular groove structure 1421 has an annular bottom end surface 1421a, a first annular side wall 1421b and a second annular side wall 1421c. The annular bottom end surface 1421a extends in a direction substantially perpendicular to the optical axis 11. The first annular side wall 1421b is connected to the annular bottom end surface 1421a and the full-circle connecting portion 1424, and extends in a direction away from the annular bottom end surface 1421a. The second annular side wall 1421c is connected to the annular bottom end surface 1421a, is located closer to the optical effective portion 141 than the annular bottom end surface 1421a, and extends in a direction away from the annular bottom end surface 1421a.

The conical surface 1422 is located closer to the optical effective portion 141 than the annular groove structure 1421. The fourth lens element 140 is correspondingly assembled with the third lens element 130 adjacent thereto by the conical surface 1422 so as to be aligned with the optical axis 11. In this embodiment, the conical surface 1422 and the second conical surface 140a form a continuous surface, so the conical surface 1422 can be considered as the second conical surface 140a.

The flat abutting portion 1423 is located closer to the optical effective portion 141 than the annular groove structure 1421, and is in physical contact with the third lens element 130 adjacent thereto.

The full-circle connecting portion 1424 is connected to the annular groove structure 1421, is located farther away from the optical effective portion 141 than the annular groove structure 1421, and defines a depth of the annular groove structure 1421.

The outer ring portion 142 of the fourth lens element 140 has a gate trace 1425. The gate trace 1425 is located farther away from the optical effective portion 141 than the annular groove structure 1421, and is located farther away from the optical effective portion 141 than the full-circle connecting portion 1424.

When a maximum outer diameter of the fourth lens element 140 is $\phi L$, the following condition is satisfied: $\phi L=3.9$ [mm].

When a maximum diameter of the second conical surface 140a is $\phi C$, the following condition is satisfied: $\phi C=3.24$ [mm].

When a minimum diameter of the first annular side wall 1421b is $\phi A1$, the following condition is satisfied: $\phi A1=3.62$ [mm].

When a maximum diameter of the second annular side wall 1421c is $\phi A2$, the following condition is satisfied: $\phi A2=3.54$ [mm].

When the minimum diameter of the first annular side wall 1421b is $\phi A1$, the maximum diameter of the second annular side wall 1421b is $\phi A2$, and the length of the annular bottom end surface 1421a in a direction perpendicular to the optical axis 11 is $(\phi A1-\phi A2)/2$, the following condition is satisfied: $(\phi A1-\phi A2)/2=0.04$ [mm].

When the maximum outer diameter of the fourth lens element 140 is $\phi L$, the minimum diameter of the first annular side wall 1421b is $\phi A1$, and the maximum diameter of the second annular side wall 1421c is $\phi A2$, the following condition is satisfied: $[\phi L/(\phi A1-\phi A2)]/\pi^2=4.94$.

When a first distance in parallel with the optical axis 11 between the full-circle connecting portion 1424 and the annular bottom end surface 1421a is d, the following condition is satisfied: $d=0.05$ [mm].

When a second distance in parallel with the optical axis 11 between the flat abutting portion 1423 and the annular bottom end surface 1421a is D, the following condition is satisfied: $D=0.08$ [mm].

When the first distance in parallel with the optical axis 11 between the full-circle connecting portion 1424 and the annular bottom end surface 1421a is d, and the second distance in parallel with the optical axis 11 between the flat abutting portion 1423 and the annular bottom end surface 1421a is D, the following condition is satisfied: $d/D=0.625$.

A projection of the second distance D on the optical axis 11 has at least one part non-overlapping with a projection of the first distance d on the optical axis 11. In other word, when a third distance in parallel with the optical axis 11 between the flat abutting portion 1423 and the full-circle connecting portion 1424 is D−d, the following condition is satisfied: $D-d=0.03$ [mm].

When the first distance in parallel with the optical axis 11 between the full-circle connecting portion 1424 and the annular bottom end surface 1421a is d, the minimum diameter of the first annular side wall 1421b is $\phi A1$, the maximum diameter of the second annular side wall 1421c is $\phi A2$, and the length of the annular bottom end surface 1421a in a direction perpendicular to the optical axis 11 is $(\phi A1-\phi A2)/2$, the following condition is satisfied: $2d/(\phi A1-\phi A2)=1.25$.

2nd Embodiment

Figure 9:
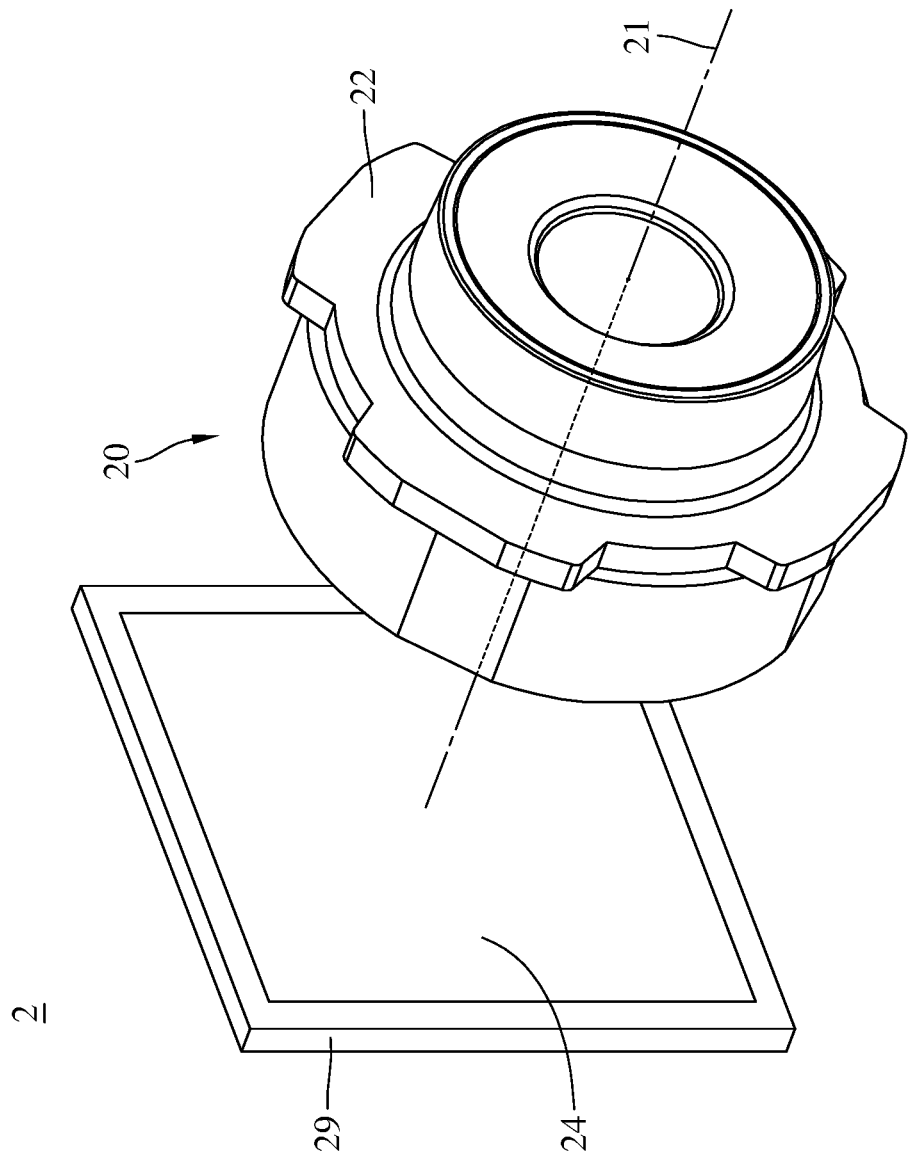
FIG. 9 is a perspective view of a camera module according to the 2nd embodiment of the present disclosure.
Figure 10:
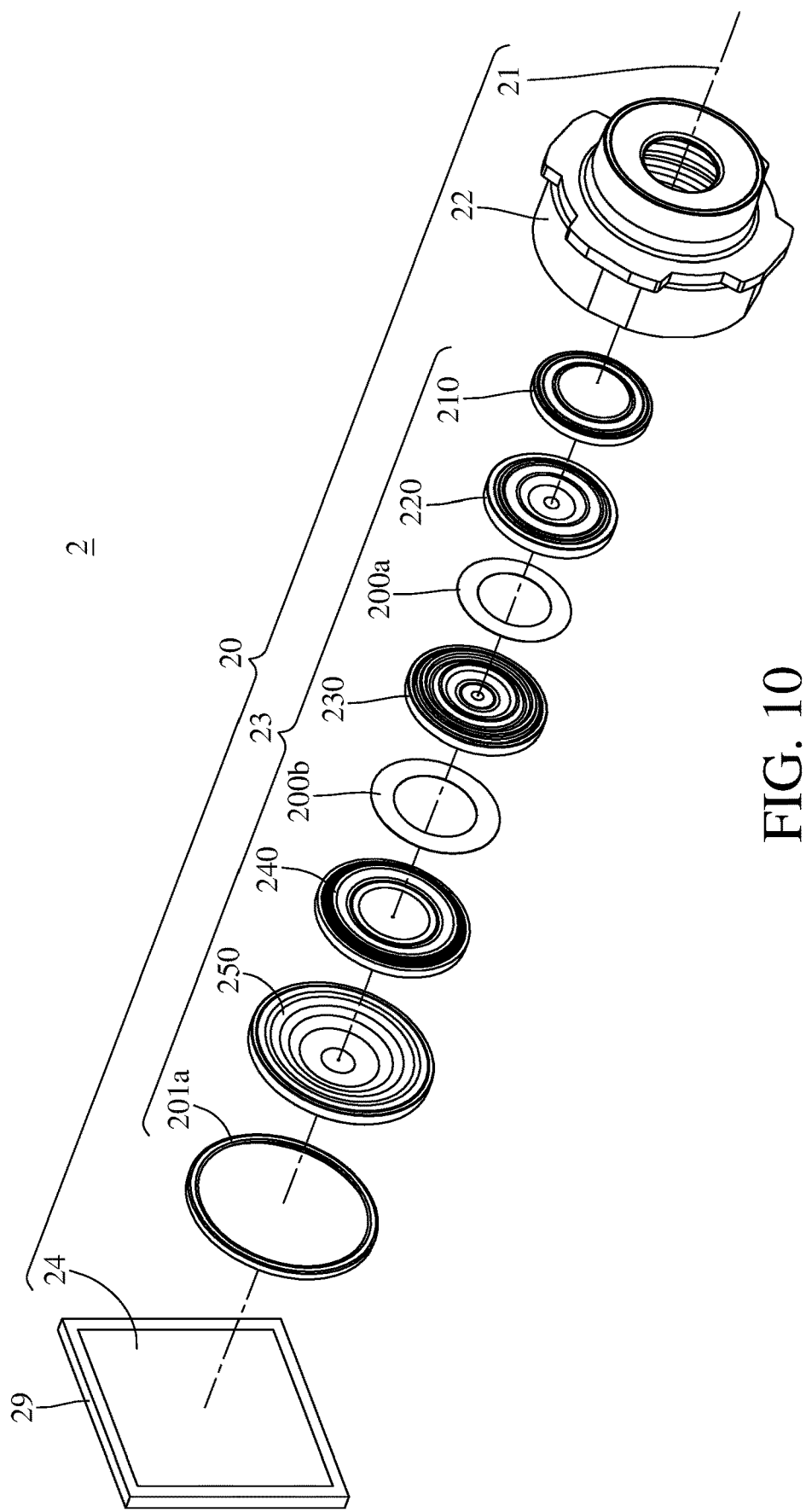
FIG. 10 is an exploded view of the camera module in FIG. 9.
Figure 11:
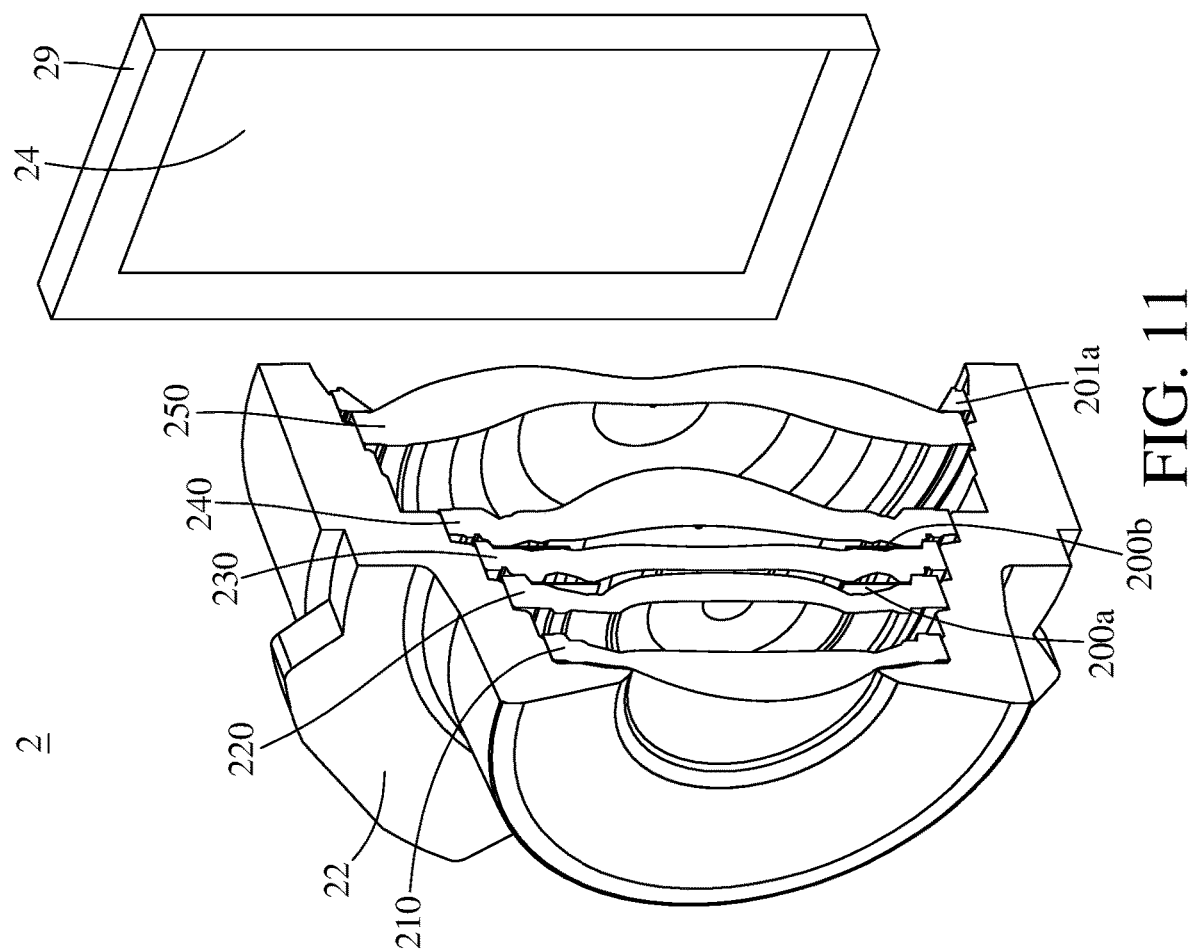
FIG. 11 is another perspective view of the sectioned camera module in FIG. 9.
Figure 12:
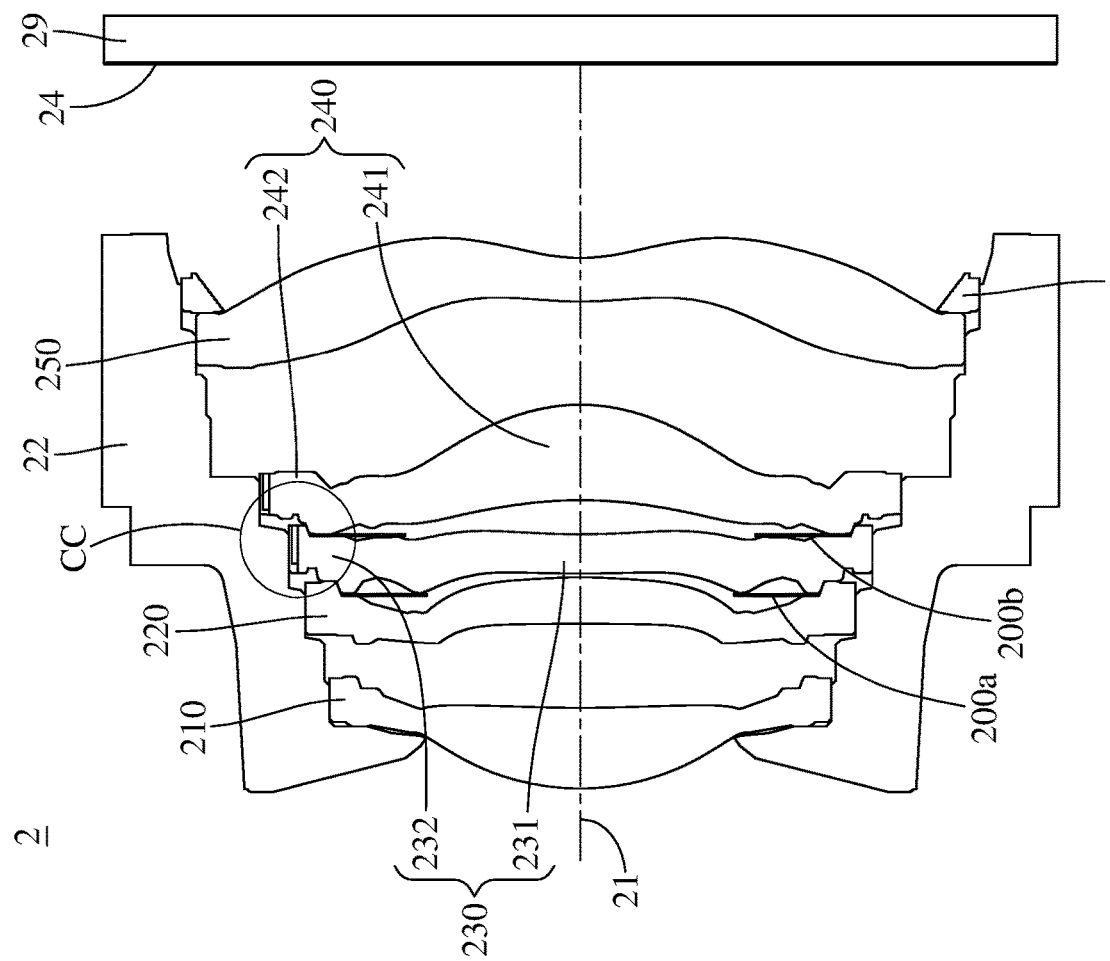
FIG. 12 is a cross-sectional view of the camera module in FIG. 9.
Figure 13:
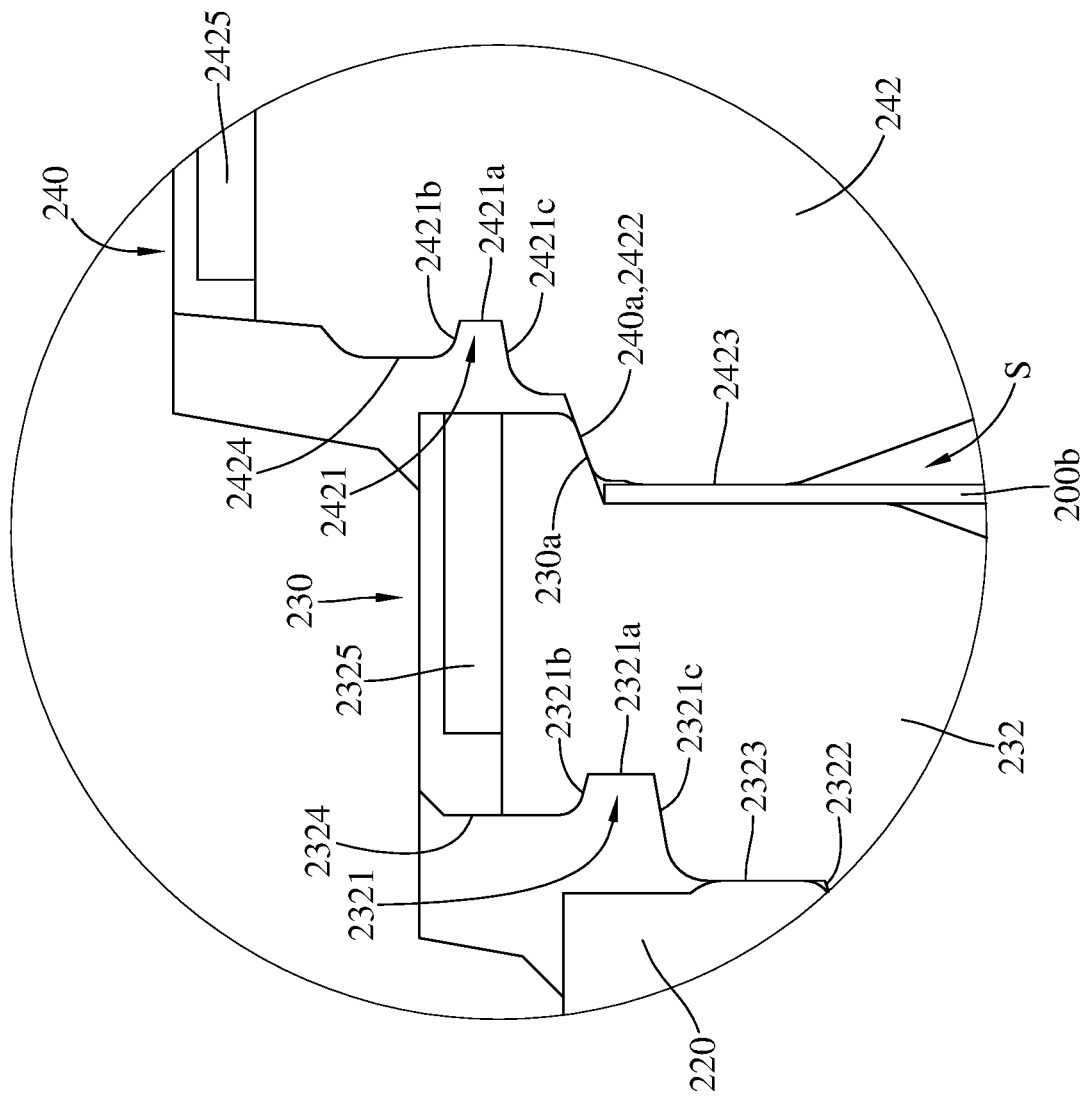
FIG. 13 is an enlarged view of the CC region of the camera module in FIG. 12.
Figure 14:
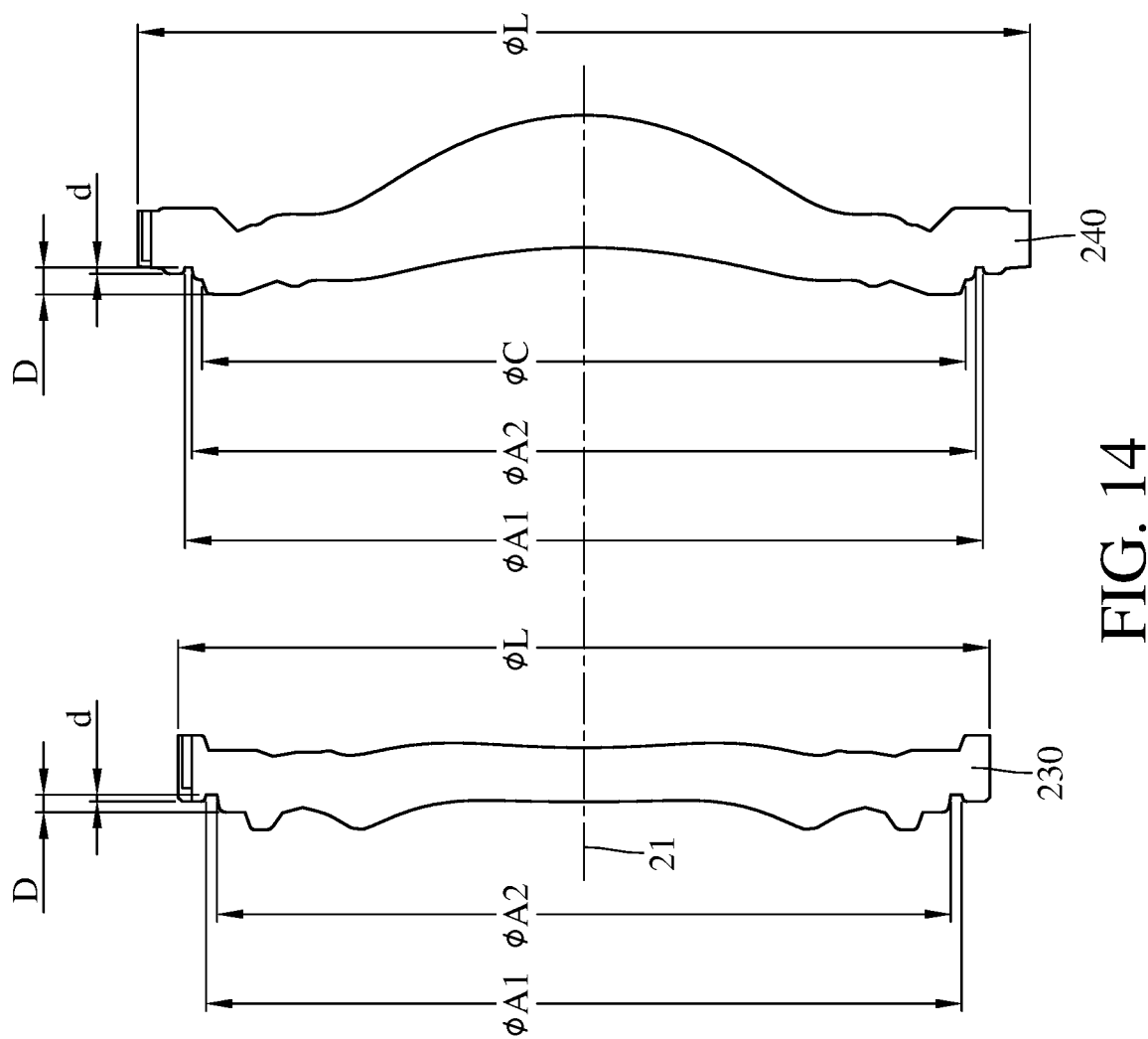
FIG. 14 is an exploded side view of the third lens element and the fourth lens element in FIG. 12.

FIG. 9 is a perspective view of a camera module according to the 2nd embodiment of the present disclosure. FIG. 10 is an exploded view of the camera module in FIG. 9. FIG. 11 is another perspective view of the sectioned camera module in FIG. 9. FIG. 12 is a cross-sectional view of the camera module in FIG. 9. FIG. 13 is an enlarged view of the CC region of the camera module in FIG. 12. FIG. 14 is an exploded side view of the third lens element and the fourth lens element in FIG. 12. Note that only the differences between this and the previous embodiments are illustrated hereinafter.

In this embodiment, a camera module 2 includes an imaging lens system 20 and an image sensor 29. The imaging lens system 20 has an optical axis 21 and includes a lens barrel 22, a plurality of optical elements 23 and an image surface 24. The optical elements 23 are disposed in the lens barrel 22 and include, in order from an object side to an image side, a first lens element 210, a second lens element 220, an optical shutter plate 200a, a third lens element 230, an optical shutter plate 200b, a fourth lens element 240, a fifth lens element 250 and a retainer 201a. The third lens element 230 is a plastic lens element, and the fourth lens element 240 is a plastic lens element. The image surface 24 is disposed on an image side of the lens barrel 22. The image sensor 29 is disposed on or near the image surface 24 of the imaging lens system 20.

The optical shutter plates 200a and 200b each have an opening being coaxial with the optical axis 21, and are respectively disposed between the second lens element 220 and the third lens element 230, and the third lens element 230 and the fourth lens element 240.

The third lens element 230 has a first conical surface 230a, and the fourth lens element 240 has a second conical surface 240a. The first conical surface 230a and the second conical surface 240a are correspondingly assembled with each other and form an accommodation space S between the third lens element 230 and the fourth lens element 240, and the optical shutter plate 200b is disposed in the accommodation space S.

The third lens element 230 includes, in order from a center to a periphery thereof, an optical effective portion 231 and an outer ring portion 232. The optical axis 21 passes through the optical effective portion 231. The outer ring portion 232 surrounds the optical effective portion 231. The outer ring portion 232 includes an annular groove structure 2321, a conical surface 2322, a flat abutting portion 2323 and a full-circle connecting portion 2324 on an object side thereof.

The annular groove structure 2321 is in a full-circle form, and is tapered off from the object side to an image side of the outer ring portion 232. The annular groove structure 2321 has an annular bottom end surface 2321a, a first annular side wall 2321b and a second annular side wall 2321c. The annular bottom end surface 2321a extends in a direction substantially perpendicular to the optical axis 21. The first annular side wall 2321b is connected to the annular bottom end surface 2321a and the full-circle connecting portion 2324, and extends in a direction away from the annular bottom end surface 2321a. The second annular side wall 2321c is connected to the annular bottom end surface 2321a, is located closer to the optical effective portion 231 than the annular bottom end surface 2321a, and extends in a direction away from the annular bottom end surface 2321a.

The conical surface 2322 is located closer to the optical effective portion 231 than the annular groove structure 2321. The third lens element 230 is correspondingly assembled with the second lens element 220 adjacent thereto by the conical surface 2322 so as to be aligned with the optical axis 21.

The flat abutting portion 2323 is located closer to the optical effective portion 231 than the annular groove structure 2321, and is in physical contact with the optical shutter plate 200a adjacent thereto.

The full-circle connecting portion 2324 is connected to the annular groove structure 2321, is located farther away from the optical effective portion 231 than the annular groove structure 2321, and defines a depth of the annular groove structure 2321.

The outer ring portion 232 of the third lens element 230 has a gate trace 2325. The gate trace 2325 is located farther away from the optical effective portion 231 than the annular groove structure 2321, and is located farther away from the optical effective portion 231 than the full-circle connecting portion 2324.

When a maximum outer diameter of the third lens element 230 is $\phi L$, the following condition is satisfied: $\phi L=6$ [mm].

When a minimum diameter of the first annular side wall 2321b is $\phi A1$, the following condition is satisfied: $\phi A1=5.59$ [mm].

When a maximum diameter of the second annular side wall 2321c is $\phi A2$, the following condition is satisfied: $\phi A2=5.43$ [mm].

When the minimum diameter of the first annular side wall 2321b is $\phi A1$, the maximum diameter of the second annular side wall 2321b is $\phi A2$, and a length of the annular bottom end surface 2321a in a direction perpendicular to the optical axis 21 is $(\phi A1-\phi A2)/2$, the following condition is satisfied: $(\phi A1-\phi A2)/2=0.08$ [mm].

When the maximum outer diameter of the third lens element 230 is $\phi L$, the minimum diameter of the first annular side wall 2321b is $\phi A1$, and the maximum diameter of the second annular side wall 2321c is $\phi A2$, the following condition is satisfied: $[\phi L/(\phi A1-\phi A2)]/\pi^2=3.80$.

When a first distance in parallel with the optical axis 21 between the full-circle connecting portion 2324 and the annular bottom end surface 2321a is d, the following condition is satisfied: $d=0.05$ [mm].

When a second distance in parallel with the optical axis 21 between the flat abutting portion 2323 and the annular bottom end surface 2321a is D, the following condition is satisfied: $D=0.13$ [mm].

When the first distance in parallel with the optical axis 21 between the full-circle connecting portion 2324 and the annular bottom end surface 2321a is d, and the second distance in parallel with the optical axis 21 between the flat abutting portion 2323 and the annular bottom end surface 2321a is D, the following condition is satisfied: $d/D=0.38$.

A projection of the second distance D on the optical axis 21 has at least one part non-overlapping with a projection of the first distance d on the optical axis 21. In other word, when a third distance in parallel with the optical axis 21 between the flat abutting portion 2323 and the full-circle connecting portion 2324 is D−d, the following condition is satisfied: $D-d=0.08$ [mm].

When the first distance in parallel with the optical axis 21 between the full-circle connecting portion 2324 and the annular bottom end surface 2321a is d, the minimum diameter of the first annular side wall 2321b is $\phi A1$, the maximum diameter of the second annular side wall 2321c is $\phi A2$, and the length of the annular bottom end surface 2321a in a direction perpendicular to the optical axis 21 is $(\phi A1-\phi A2)/2$, the following condition is satisfied: $2d/(\phi A1-\phi A2)=0.625$.

The fourth lens element 240 includes, in order from a center to a periphery thereof, an optical effective portion 241 and an outer ring portion 242. The optical axis 21 passes through the optical effective portion 241. The outer ring portion 242 surrounds the optical effective portion 241. The outer ring portion 242 includes an annular groove structure 2421, a conical surface 2422, a flat abutting portion 2423 and a full-circle connecting portion 2424 on an object side thereof.

The annular groove structure 2421 is in a full-circle form, and is tapered off from the object side to an image side of the outer ring portion 242. The annular groove structure 2421 has an annular bottom end surface 2421a, a first annular side wall 2421b and a second annular side wall 2421c. The annular bottom end surface 2421a extends in a direction substantially perpendicular to the optical axis 21. The first annular side wall 2421b is connected to the annular bottom end surface 2421a and the full-circle connecting portion 2424, and extends in a direction away from the annular bottom end surface 2421a. The second annular side wall 2421c is connected to the annular bottom end surface 2421a, is located closer to the optical effective portion 241 than the annular bottom end surface 2421a, and extends in a direction away from the annular bottom end surface 2421a.

The conical surface 2422 is located closer to the optical effective portion 241 than the annular groove structure 2421. The fourth lens element 240 is correspondingly assembled with the third lens element 230 adjacent thereto by the conical surface 2422 so as to be aligned with the optical axis 21. In this embodiment, the conical surface 2422 and the second conical surface 240a form a continuous surface, so the conical surface 2422 can be considered as the second conical surface 240a.

The flat abutting portion 2423 is located closer to the optical effective portion 241 than the annular groove structure 2421, and is in physical contact with the optical shutter plate 200b adjacent thereto.

The full-circle connecting portion 2424 is connected to the annular groove structure 2421, is located farther away from the optical effective portion 241 than the annular groove structure 2421, and defines a depth of the annular groove structure 2421.

The outer ring portion 242 of the fourth lens element 240 has a gate trace 2425. The gate trace 2425 is located farther away from the optical effective portion 241 than the annular groove structure 2421, and is located farther away from the optical effective portion 241 than the full-circle connecting portion 2424.

When a maximum outer diameter of the fourth lens element 240 is $\phi L$, the following condition is satisfied: $\phi L=6.6$ [mm].

When a maximum diameter of the second conical surface 240a is $\phi C$, the following condition is satisfied: $\phi C=5.65$ [mm].

When a minimum diameter of the first annular side wall 2421b is $\phi A1$, the following condition is satisfied: $\phi A1=5.9$ [mm].

When a maximum diameter of the second annular side wall 2421c is ϕA2, the following condition is satisfied: ϕA2=5.8 [mm].

When the minimum diameter of the first annular side wall 2421b is ϕA1, the maximum diameter of the second annular side wall 2421b is ϕA2, and the length of the annular bottom end surface 2421a in a direction perpendicular to the optical axis 21 is (ϕA1−ϕA2)/2, the following condition is satisfied: (ϕA1−ϕA2)/2=0.05 [mm].

When the maximum outer diameter of the fourth lens element 240 is ϕL, the minimum diameter of the first annular side wall 2421b is ϕA1, and the maximum diameter of the second annular side wall 2421c is ϕA2, the following condition is satisfied: [ϕL/(ϕA1−ϕA2)]/π²=6.69.

When a first distance in parallel with the optical axis 21 between the full-circle connecting portion 2424 and the annular bottom end surface 2421a is d, the following condition is satisfied: d=0.04 [mm].

When a second distance in parallel with the optical axis 21 between the flat abutting portion 2423 and the annular bottom end surface 2421a is D, the following condition is satisfied: D=0.2 [mm].

When the first distance in parallel with the optical axis 21 between the full-circle connecting portion 2424 and the annular bottom end surface 2421a is d, and the second distance in parallel with the optical axis 21 between the flat abutting portion 2423 and the annular bottom end surface 2421a is D, the following condition is satisfied: d/D=0.2.

A projection of the second distance D on the optical axis 21 has at least one part non-overlapping with a projection of the first distance d on the optical axis 21. In other word, when a third distance in parallel with the optical axis 21 between the flat abutting portion 2423 and the full-circle connecting portion 2424 is D−d, the following condition is satisfied: D−d=0.16 [mm].

When the first distance in parallel with the optical axis 21 between the full-circle connecting portion 2424 and the annular bottom end surface 2421a is d, the minimum diameter of the first annular side wall 2421b is ϕA1, the maximum diameter of the second annular side wall 2421c is ϕA2, and the length of the annular bottom end surface 2421a in a direction perpendicular to the optical axis 21 is (ϕA1−ϕA2)/2, the following condition is satisfied: 2d/(ϕA1−ϕA2)=0.8.

3rd Embodiment

Figure 15:
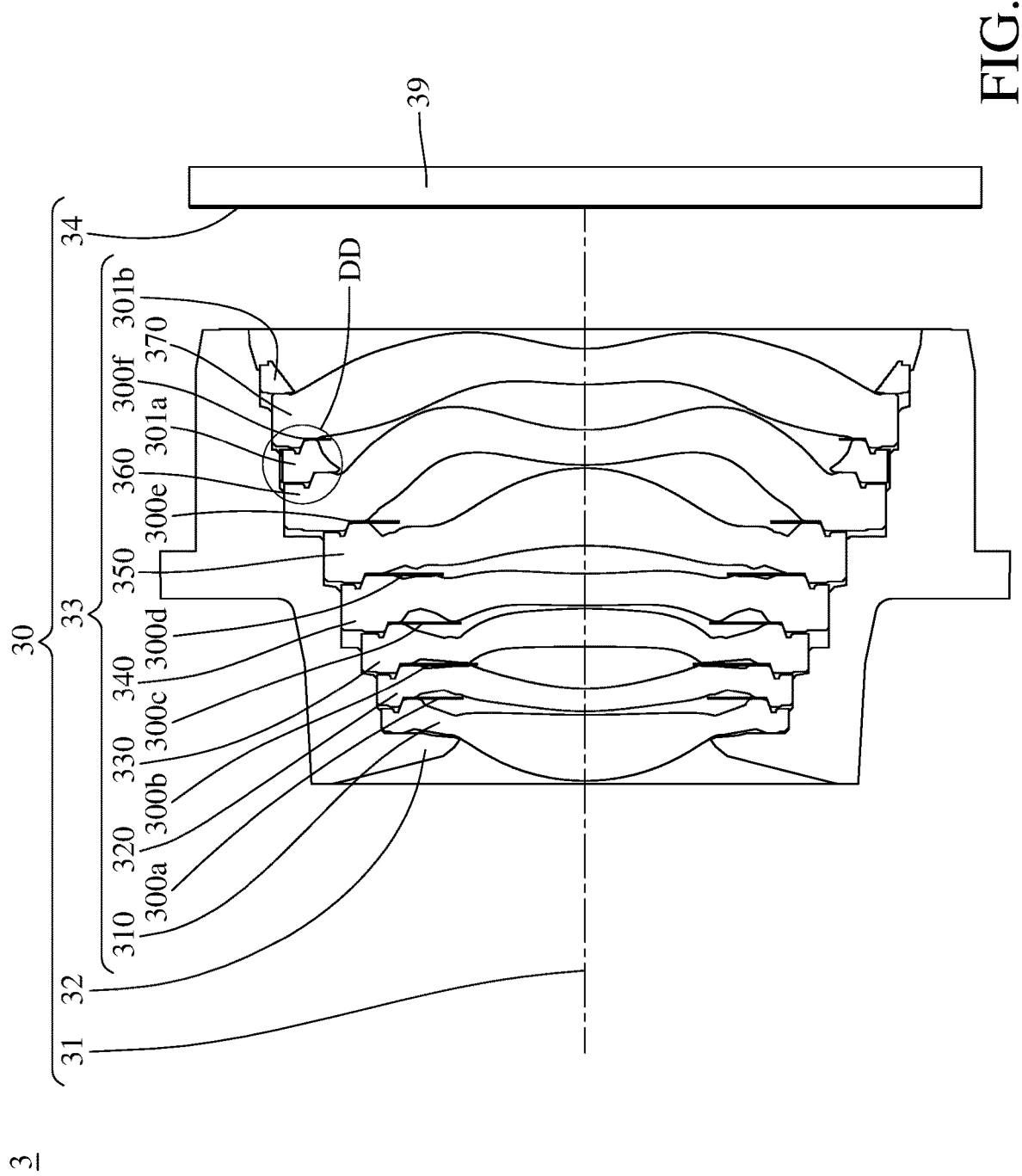
FIG. 15 is a cross-sectional view of a camera module according to the 3rd embodiment of the present disclosure.
Figure 16:
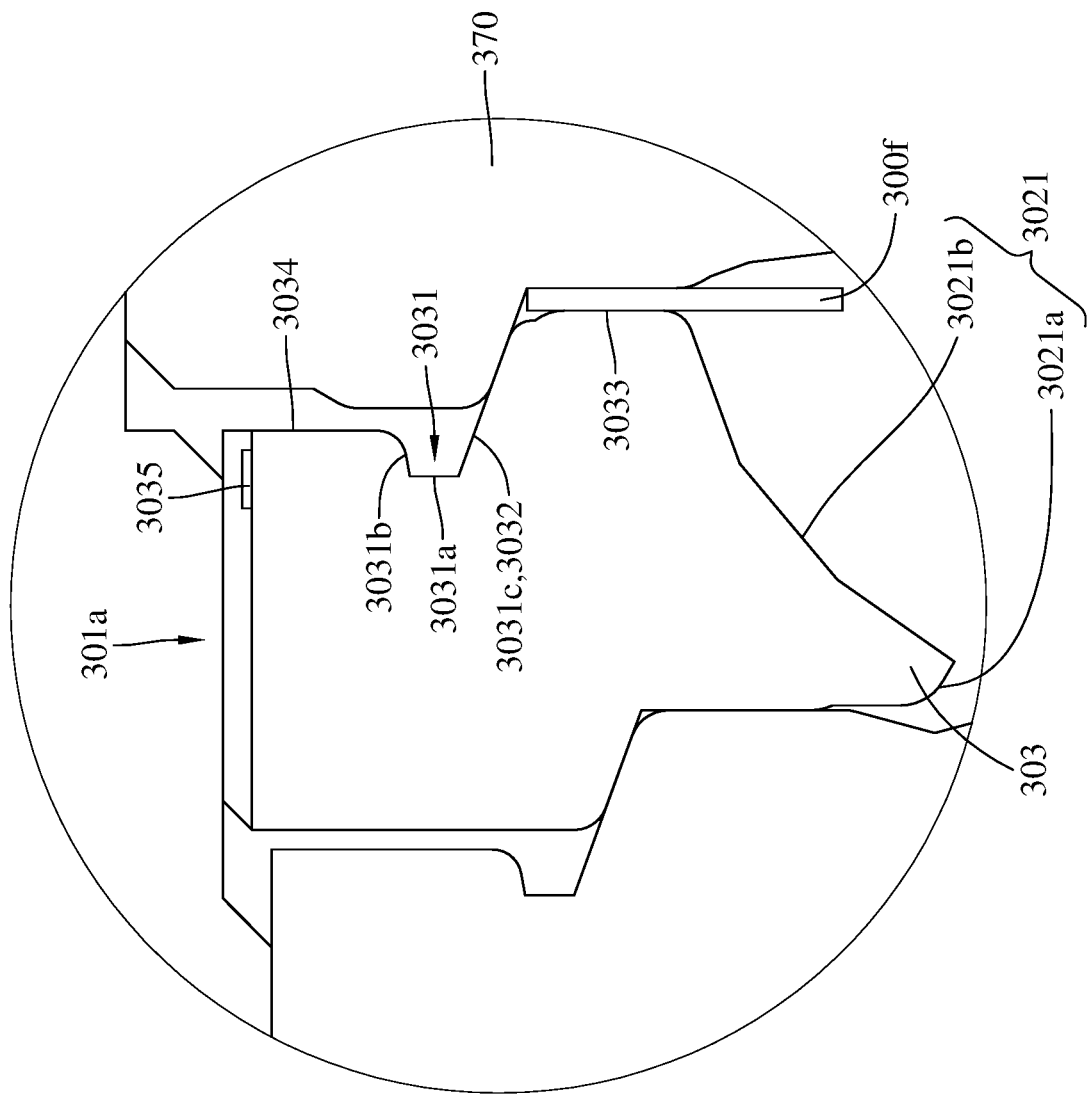
FIG. 16 is an enlarged view of the DD region of the camera module in FIG. 15.
Figure 17:
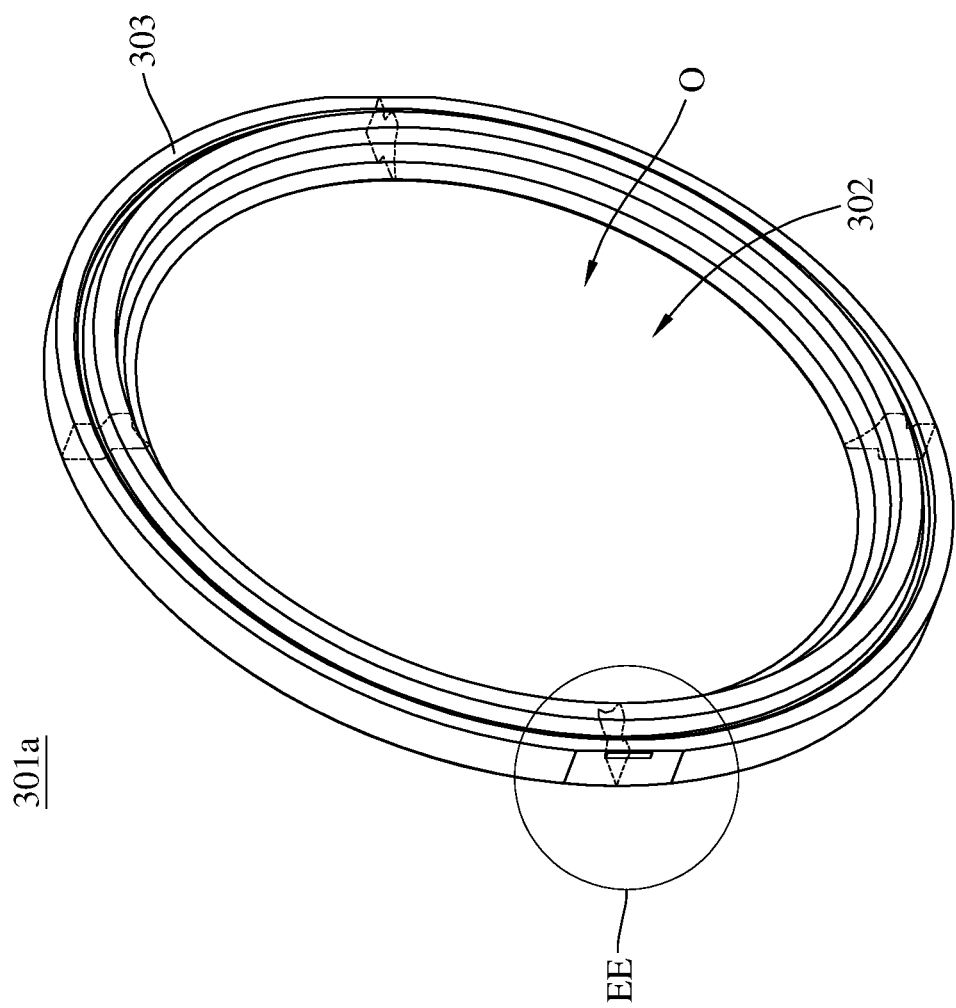
FIG. 17 is a perspective view of the spacer in FIG. 15.
Figure 18:
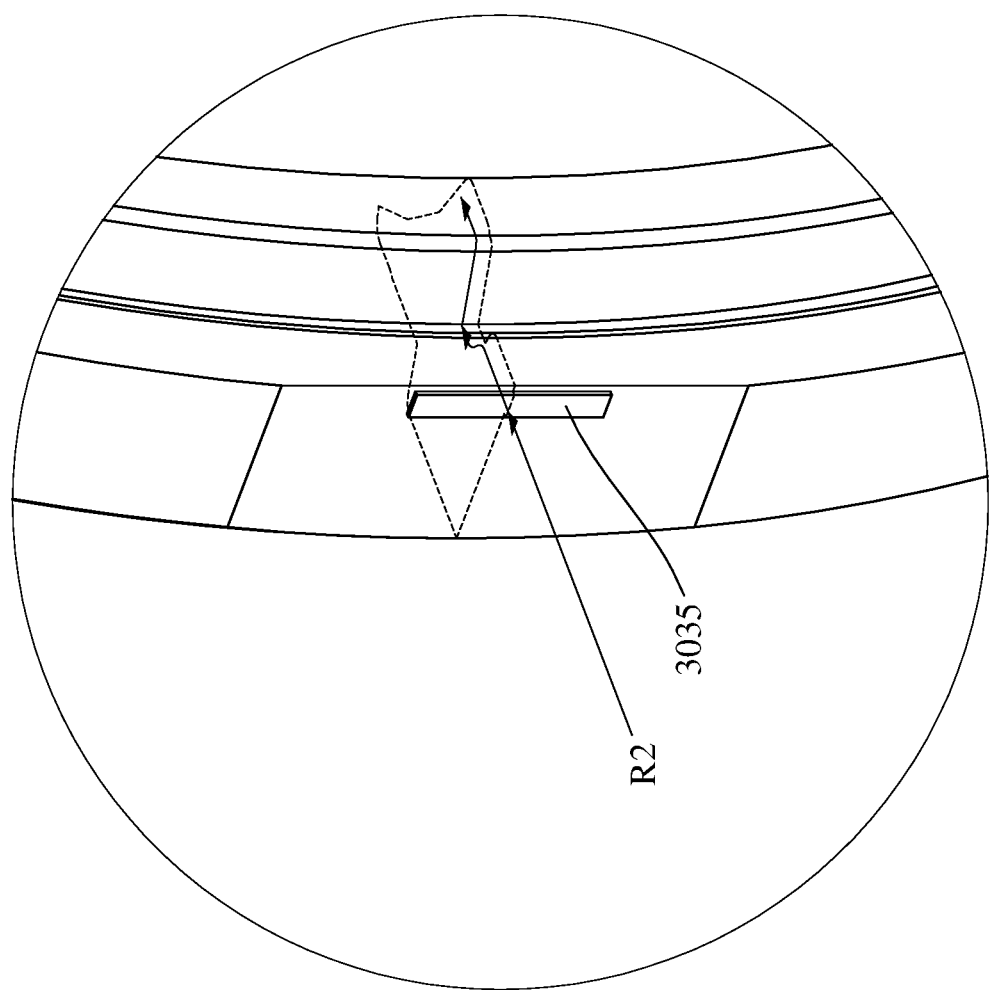
FIG. 18 is an enlarged view of the EE region of the spacer in FIG. 17.
Figure 19:
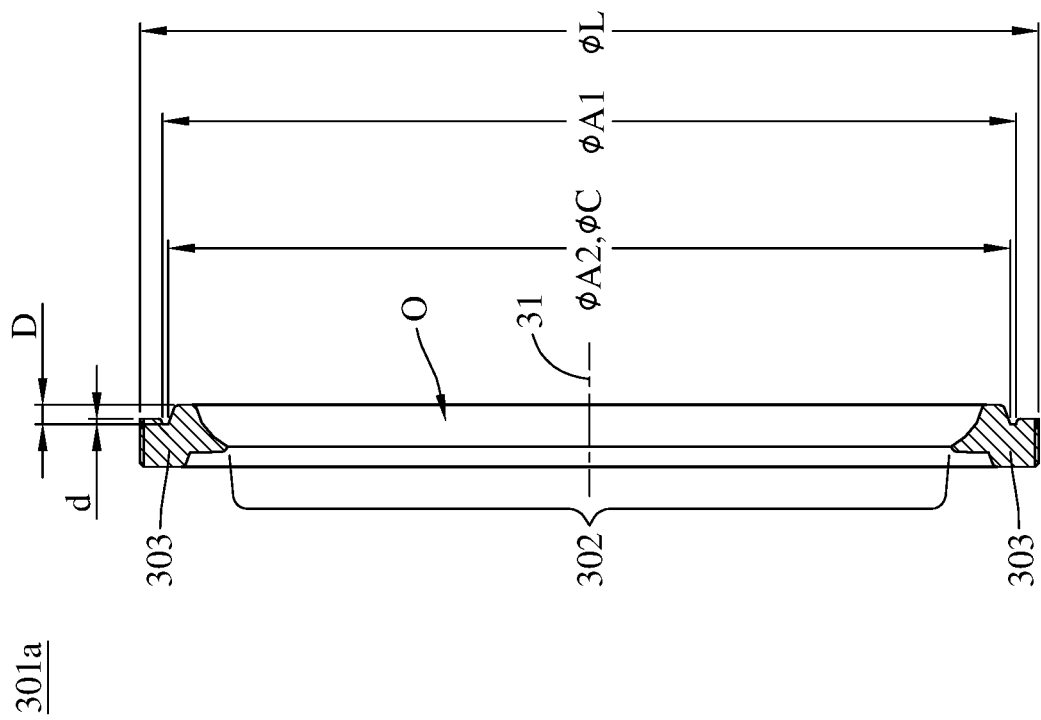
FIG. 19 is a cross-sectional view of the spacer in FIG. 15.

FIG. 15 is a cross-sectional view of a camera module according to the 3rd embodiment of the present disclosure. FIG. 16 is an enlarged view of the DD region of the camera module in FIG. 15. FIG. 17 is a perspective view of the spacer in FIG. 15. FIG. 18 is an enlarged view of the EE region of the spacer in FIG. 17. FIG. 19 is a cross-sectional view of the spacer in FIG. 15. Note that only the differences between this and the previous embodiments are illustrated hereinafter.

In this embodiment, a camera module 3 includes an imaging lens system 30 and an image sensor 39. The imaging lens system 30 has an optical axis 31 and includes a lens barrel 32, a plurality of optical elements 33 and an image surface 34. The optical elements 33 are disposed in the lens barrel 32 and include, in order from an object side to an image side, a first lens element 310, an optical shutter plate 300a, a second lens element 320, an optical shutter plate 300b, a third lens element 330, an optical shutter plate 300c, a fourth lens element 340, an optical shutter plate 300d, a fifth lens element 350, an optical shutter plate 300e, a sixth lens element 360, a spacer 301a, an optical shutter plate 300f, a seventh lens element 370 and a retainer 301b. The image surface 34 is disposed on an image side of the lens barrel 32. The image sensor 39 is disposed on or near the image surface 34 of the imaging lens system 30.

The optical shutter plates 300a, 300b, 300c, 300d, 300e and 300f each have an opening being coaxial with the optical axis 31, and are respectively disposed between the first lens element 310 and the second lens element 320, the second lens element 320 and the third lens element 330, the third lens element 330 and the fourth lens element 340, the fourth lens element 340 and the fifth lens element 350, the fifth lens element 350 and the sixth lens element 360, and the sixth lens element 360 and the seventh lens element 370.

The spacer 301a includes, in order from a center to a periphery thereof, a central portion 302 and an outer ring portion 303. The optical axis 31 passes through the central portion 302. The outer ring portion 303 surrounds the central portion 302.

The central portion 302 includes a central opening structure 3021. The central opening structure 3021 has a first tapered surface 3021a and a second tapered surface 3021b that surround the central portion 302. The first tapered surface 3021a faces the object side and is tapered off towards the image side. The second tapered surface 3021b faces the image side and is tapered off towards the object side. The first tapered surface 3021a and the second tapered surface 3021b are connected to form a central opening O.

The outer ring portion 303 includes an annular groove structure 3031, a conical surface 3032, a flat abutting portion 3033 and a full-circle connecting portion 3034 on an image side thereof.

The annular groove structure 3031 is in a full-circle form, and is tapered off from the image side to an object side of the outer ring portion 303. The annular groove structure 3031 has an annular bottom end surface 3031a, a first annular side wall 3031b and a second annular side wall 3031c. The annular bottom end surface 3031a extends in a direction substantially perpendicular to the optical axis 31. The first annular side wall 3031b is connected to the annular bottom end surface 3031a and the full-circle connecting portion 3034, and extends in a direction away from the annular bottom end surface 3031a. The second annular side wall 3031c is connected to the annular bottom end surface 3031a, is located closer to the central portion 302 than the annular bottom end surface 3031a, and extends in a direction away from the annular bottom end surface 3031a.

The conical surface 3032 is located closer to the central portion 302 than the annular groove structure 3031. The spacer 301a is correspondingly assembled with the seventh lens element 370 adjacent thereto by the conical surface 3032 so as to be aligned with the optical axis 31. In this embodiment, the conical surface 3032 and the second annular side wall 3031c form a continuous surface, so the conical surface 3032 can be considered as a surface of the second annular side wall 3031c.

The flat abutting portion 3033 is located closer to the central portion 302 than the annular groove structure 3031, and is in physical contact with the optical shutter plate 300f adjacent thereto.

The full-circle connecting portion 3034 is connected to the annular groove structure 3031, and is located farther away from the central portion 302 than the annular groove structure 3031.

The outer ring portion 303 of the spacer 301a has a gate trace 3035. The gate trace 3035 is located farther away from the central portion 302 than the annular groove structure 3031, and is located farther away from the central portion 302 than the full-circle connecting portion 3034.

When a maximum outer diameter of the spacer 301a is φL, the following condition is satisfied: φL=7.7 [mm].

When a maximum diameter of the conical surface 3032 is φC, the following condition is satisfied: φC=7.22 [mm].

When a minimum diameter of the first annular side wall 3031b is φA1, the following condition is satisfied: φA1=7.32 [mm].

When a maximum diameter of the second annular side wall 3031c is φA2, the following condition is satisfied: φA2=7.22 [mm].

When the minimum diameter of the first annular side wall 3031b is φA1, the maximum diameter of the second annular side wall 3321b is φA2, and a length of the annular bottom end surface 3031a in a direction perpendicular to the optical axis 31 is (φA1−φA2)/2, the following condition is satisfied: (φA1−φA2)/2=0.05 [mm].

When the maximum outer diameter of the spacer 301a is φL, the minimum diameter of the first annular side wall 3031b is φA1, and the maximum diameter of the second annular side wall 3031c is φA2, the following condition is satisfied: [φL/(φA1−φA2)]/π²=7.80.

When a first distance in parallel with the optical axis 31 between the full-circle connecting portion 3034 and the annular bottom end surface 3031a is d, the following condition is satisfied: d=0.05 [mm].

When a second distance in parallel with the optical axis 31 between the flat abutting portion 3033 and the annular bottom end surface 3031a is D, the following condition is satisfied: D=0.17 [mm].

When the first distance in parallel with the optical axis 31 between the full-circle connecting portion 3034 and the annular bottom end surface 3031a is d, and the second distance in parallel with the optical axis 31 between the flat abutting portion 3033 and the annular bottom end surface 3031a is D, the following condition is satisfied: d/D=0.29.

A projection of the second distance D on the optical axis 31 has at least one part non-overlapping with a projection of the first distance d on the optical axis 31. In other word, when a third distance in parallel with the optical axis 31 between the flat abutting portion 3033 and the full-circle connecting portion 3034 is D−d, the following condition is satisfied: D−d=0.12 [mm].

When the first distance in parallel with the optical axis 31 between the full-circle connecting portion 3034 and the annular bottom end surface 3031a is d, the minimum diameter of the first annular side wall 3031b is φA1, the maximum diameter of the second annular side wall 3031c is φA2, and the length of the annular bottom end surface 3031a in a direction perpendicular to the optical axis 31 is (φA1−φA2)/2, the following condition is satisfied: 2d/(φA1−φA2)=1.0.

4th Embodiment

Figure 20:
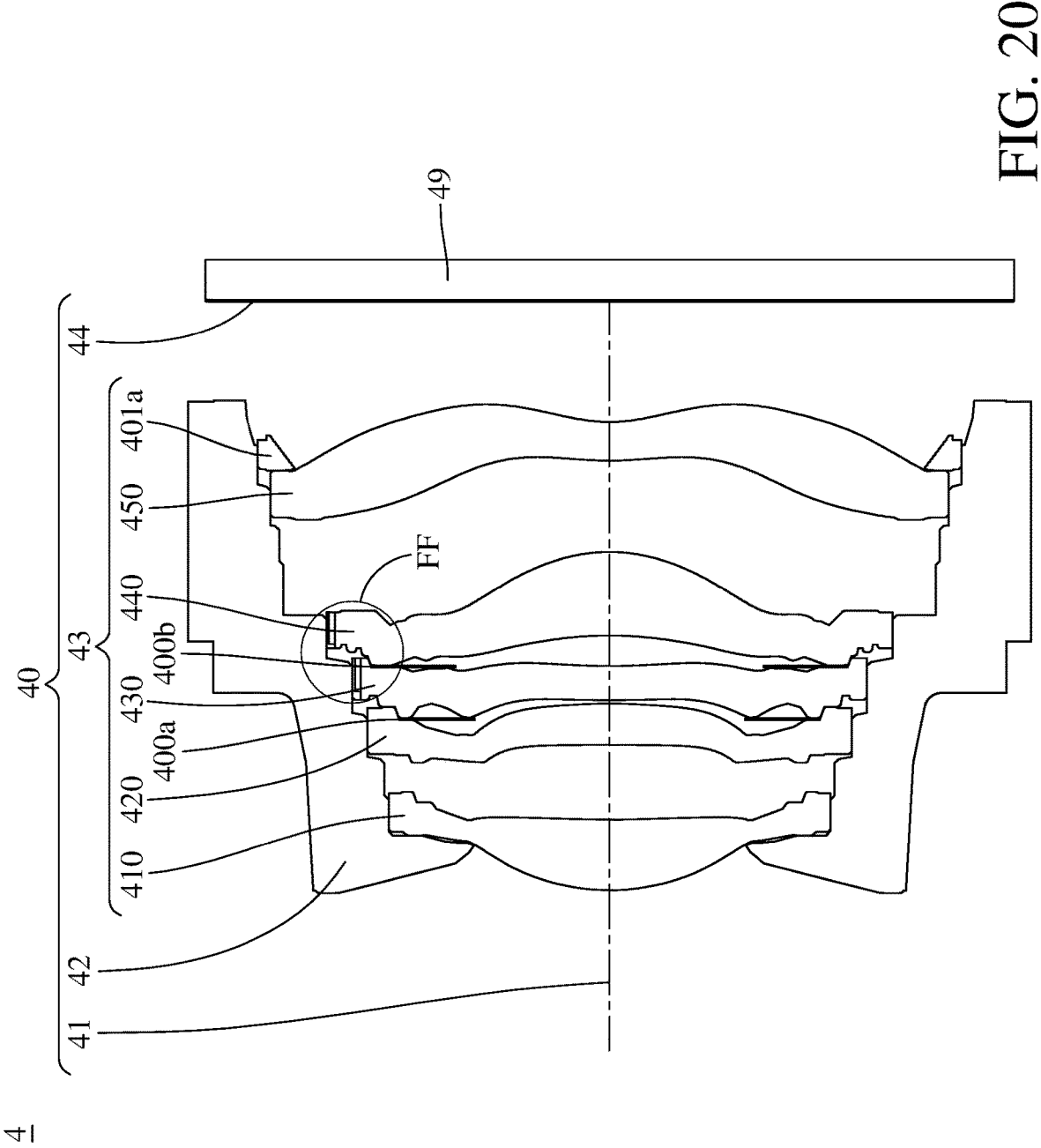
FIG. 20 is a cross-sectional view of a camera module according to the 4th embodiment of the present disclosure.
Figure 21:
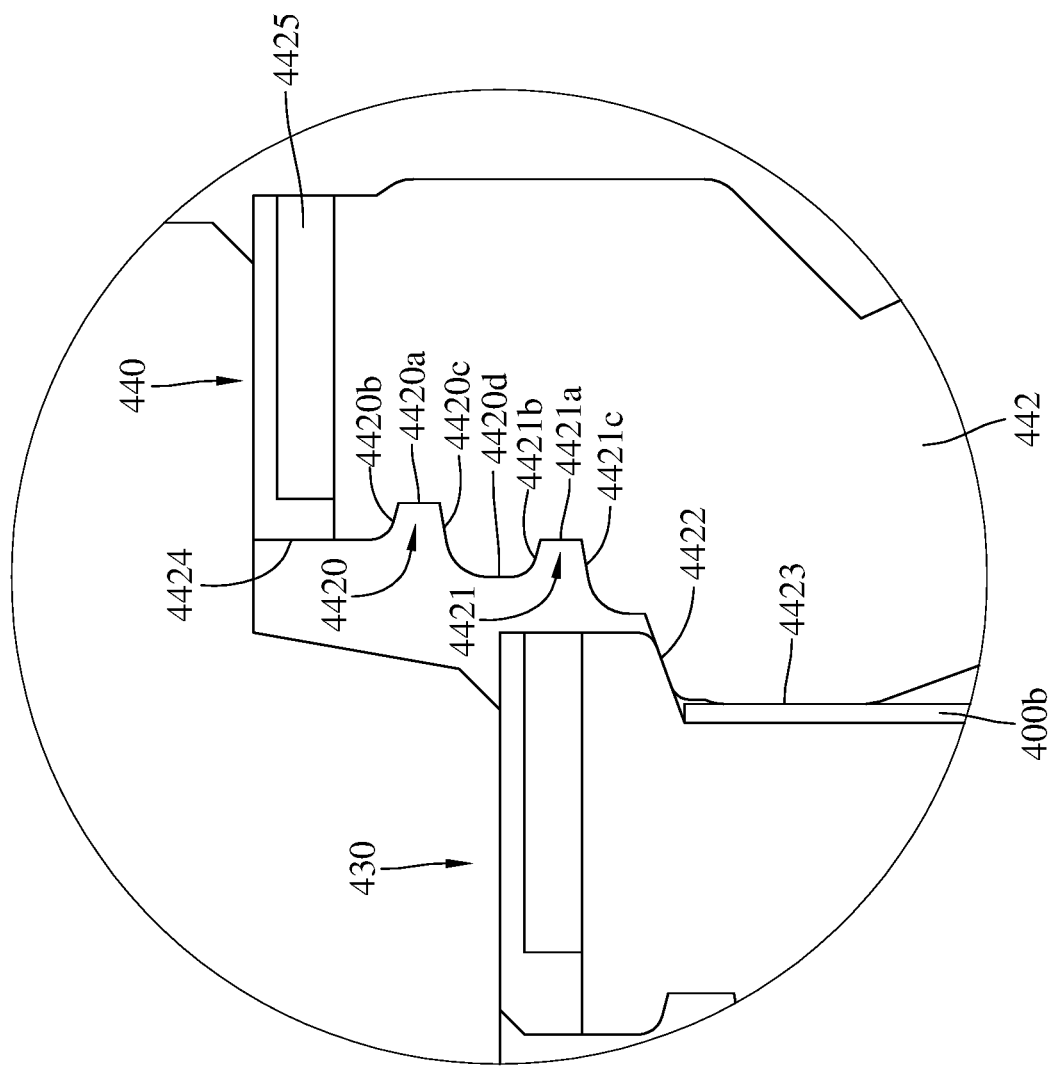
FIG. 21 is an enlarged view of the FF region of the camera module in FIG. 20.
Figure 22:
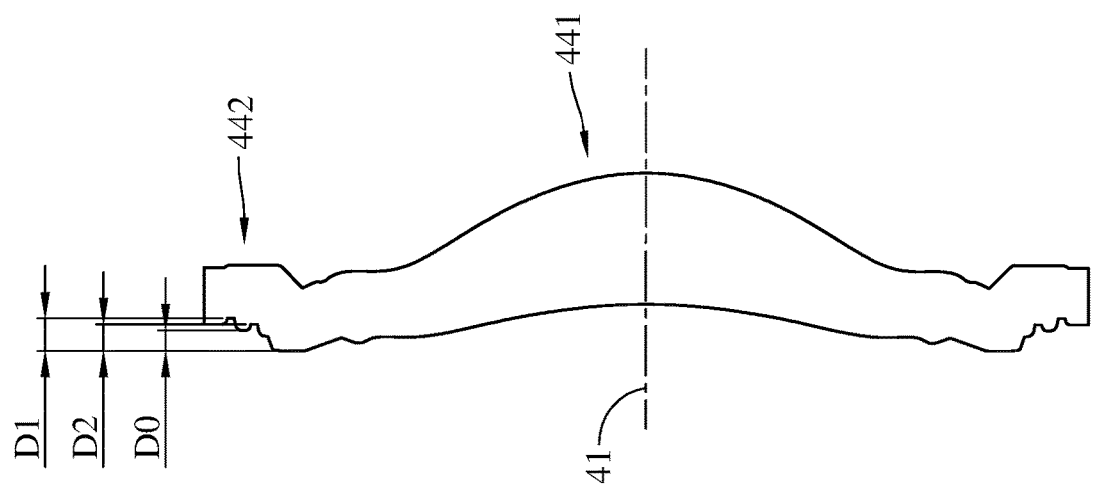
FIG. 22 is a cross-sectional view of the fourth lens element in FIG. 20.

FIG. 20 is a cross-sectional view of a camera module according to the 4th embodiment of the present disclosure. FIG. 21 is an enlarged view of the FF region of the camera module in FIG. 20. FIG. 22 is a cross-sectional view of the fourth lens element in FIG. 20. Note that only the differences between this and the previous embodiments are illustrated hereinafter.

In this embodiment, a camera module 4 includes an imaging lens system 40 and an image sensor 49. The imaging lens system 40 has an optical axis 41 and includes a lens barrel 42, a plurality of optical elements 43 and an image surface 44. The optical elements 43 are disposed in the lens barrel 42 and include, in order from an object side to an image side, a first lens element 410, a second lens element 420, an optical shutter plate 400a, a third lens element 430, an optical shutter plate 400b, a fourth lens element 440, a fifth lens element 450 and a retainer 401a. The fourth lens element 440 is a plastic lens element. The image surface 44 is disposed on an image side of the lens barrel 42. The image sensor 49 is disposed on or near the image surface 44 of the imaging lens system 40.

The optical shutter plates 400a and 400b each have an opening being coaxial with the optical axis 41, and are respectively disposed between the second lens element 420 and the third lens element 430, and the third lens element 430 and the fourth lens element 440.

The fourth lens element 440 includes, in order from a center to a periphery thereof, an optical effective portion 441 and an outer ring portion 442. The optical axis 41 passes through the optical effective portion 441. The outer ring portion 442 surrounds the optical effective portion 441. The outer ring portion 442 includes an annular groove structure 4420, an annular groove structure 4421, a conical surface 4422, a flat abutting portion 4423 and a full-circle connecting portion 4424 on an object side thereof.

Each of the annular groove structures 4420 and 4421 is in a full-circle form, and is tapered off from the object side to an image side of the outer ring portion 442. The annular groove structure 4420 has an annular bottom end surface 4420a, a first annular side wall 4420b, a second annular side wall 4420c and an annular top end surface 4420d. The annular bottom end surface 4420a extends in a direction substantially perpendicular to the optical axis 41. The first annular side wall 4420b is connected to the annular bottom end surface 4420a and the full-circle connecting portion 4424, and extends in a direction away from the annular bottom end surface 4420a. The second annular side wall 4420c is connected to the annular bottom end surface 4420a and the annular top end surface 4420d, is located closer to the optical effective portion 441 than the annular bottom end surface 4420a, and extends in a direction away from the annular bottom end surface 4420a. The annular top end surface 4420d extends in a direction substantially perpendicular to the optical axis 41.

The annular groove structure 4421 has an annular bottom end surface 4421a, a first annular side wall 4421b and a second annular side wall 4421c. The annular bottom end surface 4421a extends in a direction substantially perpendicular to the optical axis 41. The first annular side wall 4421b is connected to the annular bottom end surface 4421a and the annular top end surface 4420d, and extends in a direction away from the annular bottom end surface 4421a. The second annular side wall 4421c is connected to the annular bottom end surface 4421a, is located closer to the optical effective portion 441 than the annular bottom end surface 4421a, and extends in a direction away from the annular bottom end surface 4421a.

The conical surface 4422 is located closer to the optical effective portion 441 than the annular groove structure 4421. The fourth lens element 440 is correspondingly assembled with the third lens element 430 adjacent thereto by the conical surface 4422 so as to be aligned with the optical axis 41.

The flat abutting portion 4423 is located closer to the optical effective portion 441 than the annular groove structure 4421, and is in physical contact with the optical shutter plate 400b adjacent thereto.

The full-circle connecting portion 4424 is connected to the annular groove structure 4420, and is located farther away from the optical effective portion 441 than the annular groove structure 4420.

The outer ring portion 442 of the fourth lens element 440 has a gate trace 4425. The gate trace 4425 is located farther away from the optical effective portion 441 than the annular groove structure 4420, and is located farther away from the optical effective portion 441 than the full-circle connecting portion 4424.

When the number of the annular bottom end surface 4420a is Nb, the following condition is satisfied: Nb=2.

When the number of the annular top end surface 4420d is Nt, the following condition is satisfied: Nt=1.

When a fourth distance in parallel with the optical axis 41 between the flat abutting portion 4423 and the annular bottom end surface 4420a is D1, the following condition is satisfied: D1=0.25 [mm].

When a fifth distance in parallel with the optical axis 41 between the flat abutting portion 4423 and the annular bottom end surface 4421a is D2, the following condition is satisfied: D2=0.2 [mm].

When a sixth distance in parallel with the optical axis 41 between the flat abutting portion 4423 and the annular top end surface 4420d is D0, the following condition is satisfied: D0=0.15 [mm].

5th Embodiment

Figure 23:
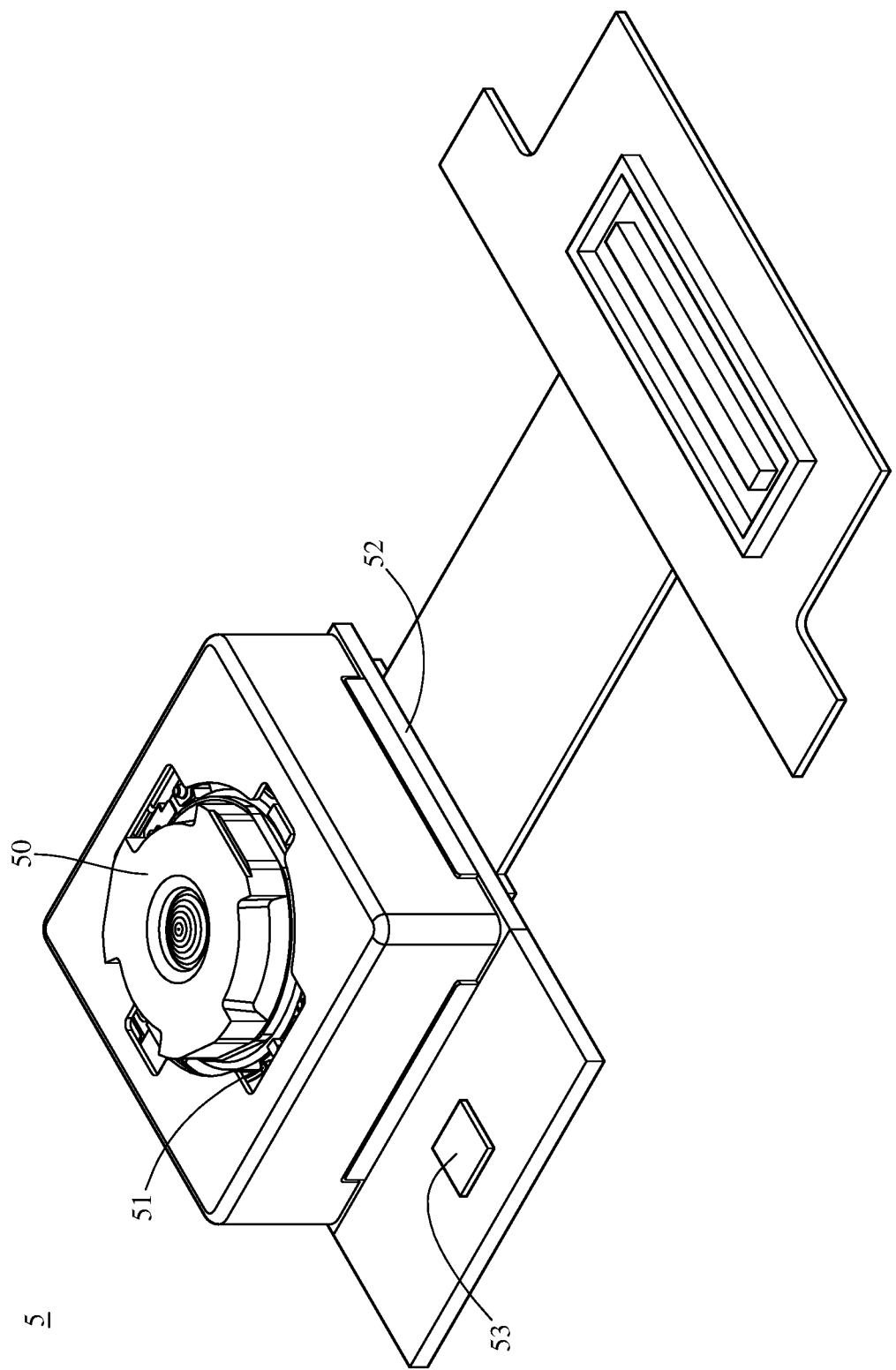
FIG. 23 is a perspective view of a camera module according to the 5th embodiment of the present disclosure.

FIG. 23 is a perspective view of a camera module according to the 5th embodiment of the present disclosure. In this embodiment, a camera module 5 includes an imaging lens system 50, a driving device 51, an image sensor 52 and an image stabilizer 53. The imaging lens system 50 is, for example, the same as the imaging lens system 10 disclosed in the 1st embodiment, and includes a lens barrel and a holder member (their reference numerals are omitted) for holding a plurality of optical elements (not shown). The imaging light converges in the imaging lens system 50 of the camera module 5 to generate an image with the driving device 51 utilized for image focusing on the image sensor 52, and the generated image is then digitally transmitted to other electronic component for further processing.

The driving device 51 can have auto focusing functionality, and different driving configurations can be obtained through the usages of voice coil motors (VCM), micro electro-mechanical systems (MEMS), piezoelectric systems, or shape memory alloy materials. The driving device 51 is favorable for obtaining a better imaging position of the imaging lens system 50, so that a clear image of the imaged object can be captured by the imaging lens system 50 with different object distances. The image sensor 52 (for example, CCD or CMOS), which can feature high photosensitivity and low noise, is disposed on the image surface of the imaging lens system 50 to provide higher image quality.

The image stabilizer 53, such as an accelerometer, a gyro sensor and a Hall Effect sensor, is configured to work with the driving device 51 to provide optical image stabilization (OIS). The driving device 51 working with the image stabilizer 53 is favorable for compensating for pan and tilt of the imaging lens system 50 to reduce blurring associated with motion during exposure. In some cases, the compensation can be provided by electronic image stabilization (EIS) with image processing software, thereby improving image quality while in motion or low-light conditions.

6th Embodiment

Figure 24:
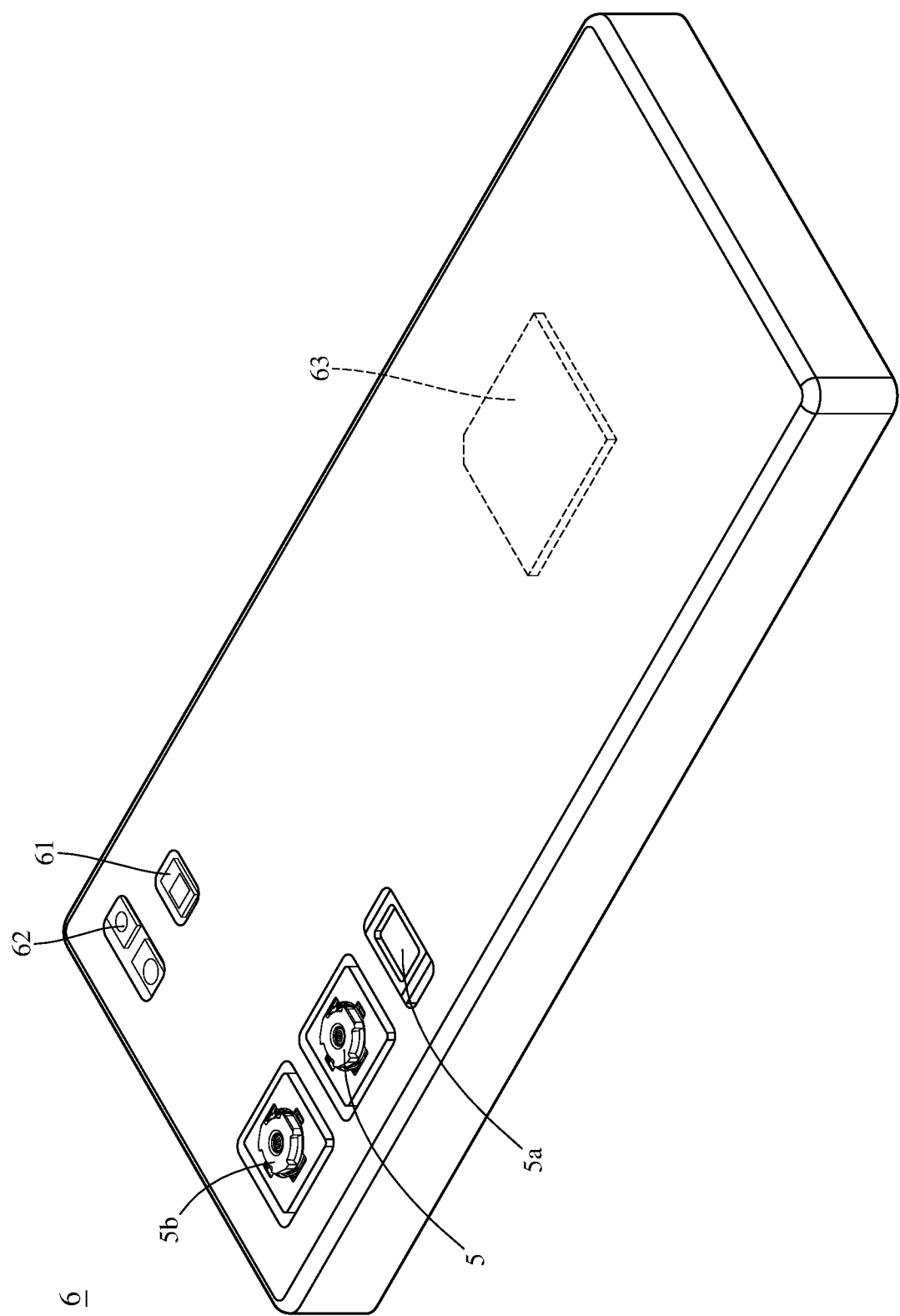
FIG. 24 is one perspective view of an electronic device according to the 6th embodiment of the present disclosure.

FIG. 24 is one perspective view of an electronic device according to the 6th embodiment of the present disclosure.

Figure 25:
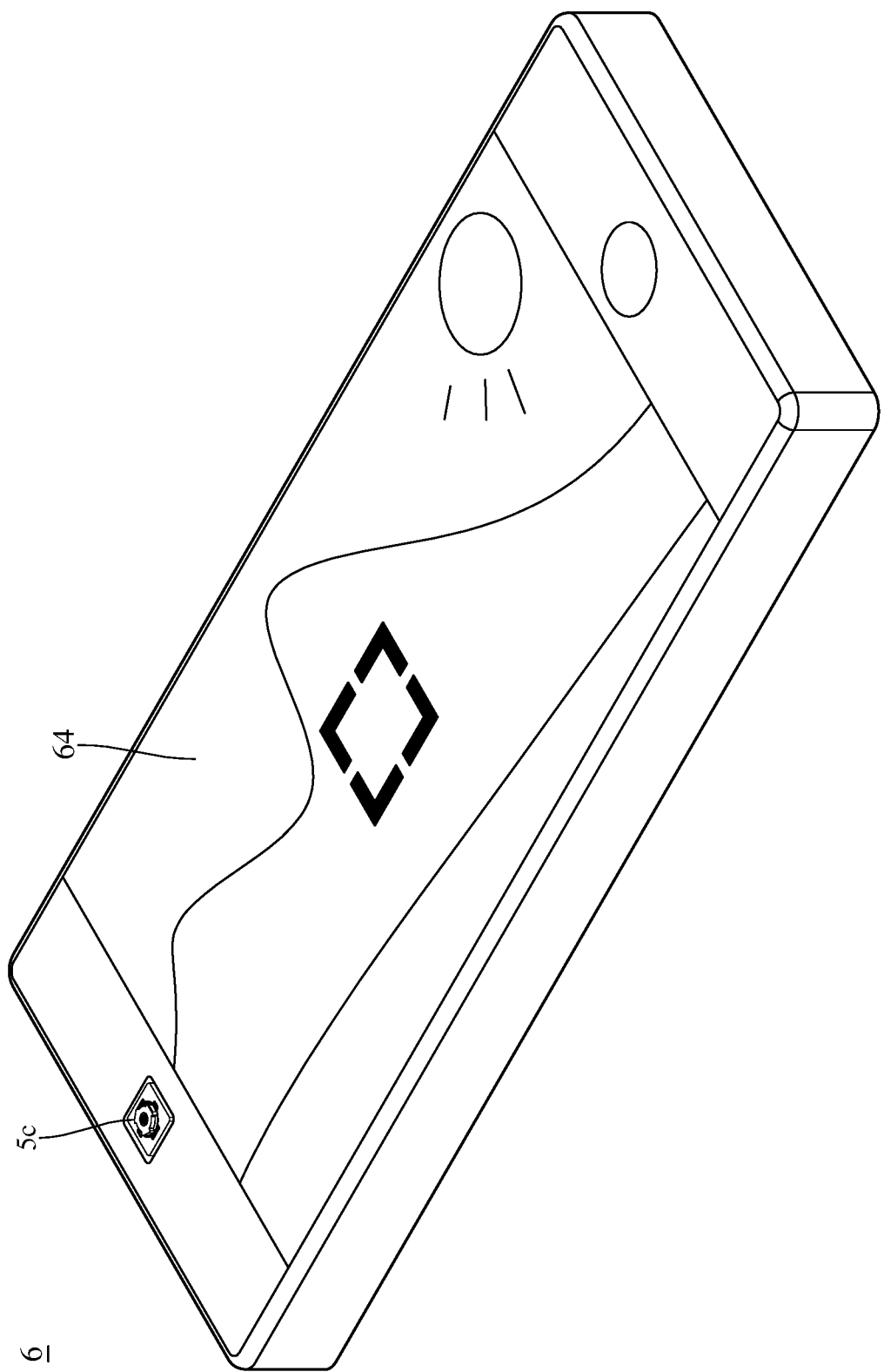
FIG. 25 is another perspective view of the electronic device in FIG. 24.
Figure 26:
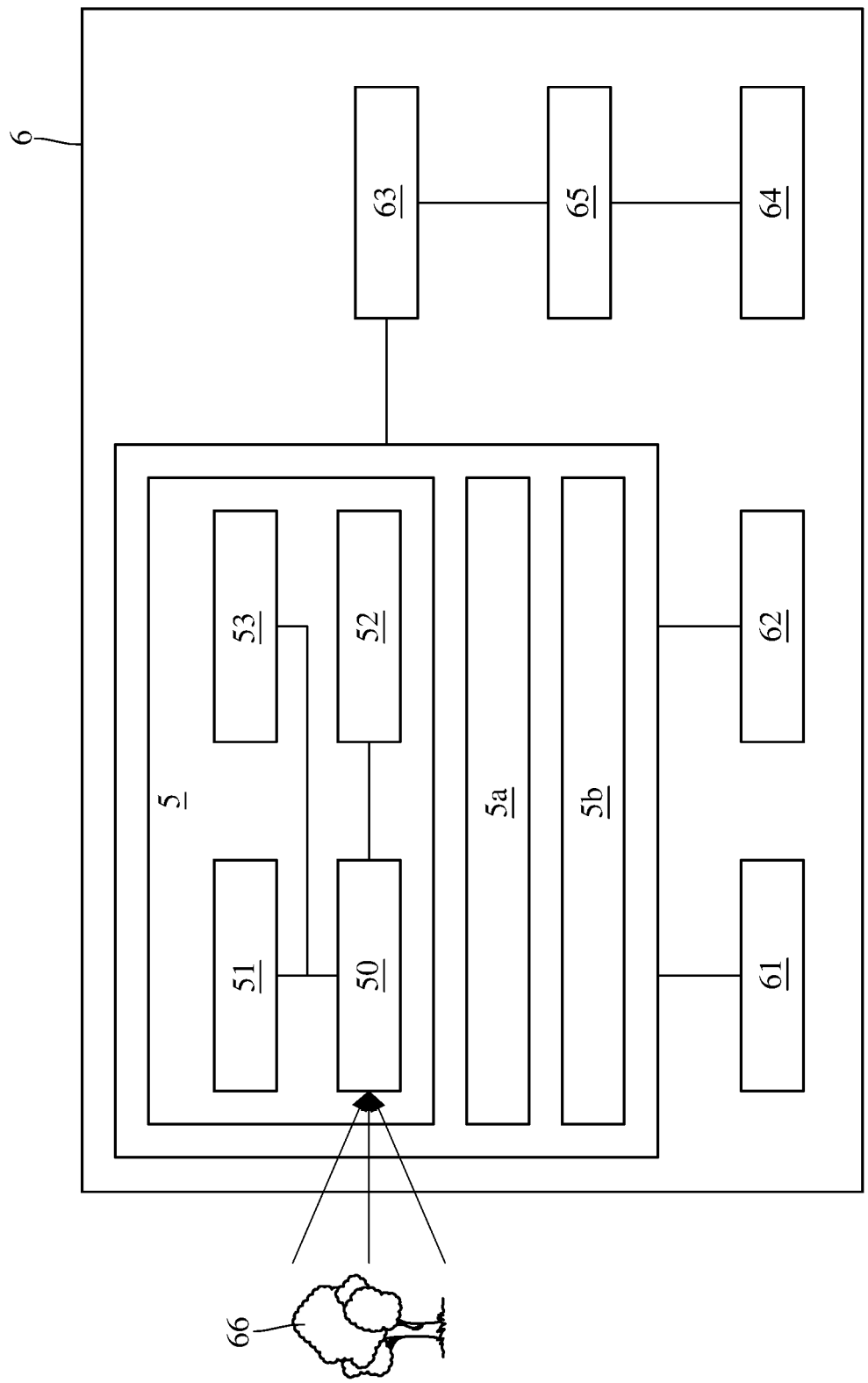
FIG. 26 is a block diagram of the electronic device in FIG. 24.

FIG. 25 is another perspective view of the electronic device in FIG. 24. FIG. 26 is a block diagram of the electronic device in FIG. 24.

In this embodiment, an electronic device 6 is a smartphone including the camera module 5 disclosed in the 5th embodiment, a camera module 5a, a camera module 5b, a camera module 5c, a flash module 61, a focus assist module 62, an image signal processor 63, a user interface 64 and an image software processor 65. The camera module 5c is located on the same side as the user interface 64, and the camera module 5, the camera module 5a and the camera module 5b are located on the opposite side. The camera module 5, the camera module 5a and the camera module 5b all face the same direction, and each of the camera modules 5, 5a and 5b has a single focal point. Furthermore, the camera module 5a, the camera module 5b and the camera module 5c all have a configuration similar to that of the camera module 5. In detail, each of the camera module 5a, the camera module 5b and the camera module 5c includes an imaging lens system, a driving device, an image sensor and an image stabilizer, and the imaging lens system includes a lens assembly, a lens barrel and a holder member for holding the lens assembly.

In this embodiment, the camera modules 5, 5a and 5b have different fields of view (e.g., the camera module 5 is a standard image capturing unit, the camera module 5a is a telephoto image capturing unit and the camera module 5b is a wide-angle image capturing unit), such that the electronic device 6 has various magnification ratios so as to meet the requirement of optical zoom functionality. In this embodiment, the electronic device 6 includes multiple camera modules 5, 5a, 5b and 5c, but the present disclosure is not limited to the number and arrangement of camera modules.

When a user captures images of an object 66, the light rays converge in the camera module 5, the camera module 5a or the camera module 5b to generate an image(s), and the flash module 61 is activated for light supplement. The focus assist module 62 detects the object distance of the imaged object 66 to achieve fast auto focusing. The image signal processor 63 is configured to optimize the captured image to improve image quality. The light beam emitted from the focus assist module 62 can be either conventional infrared or laser. In addition, the electronic device 6 can capture images of the object 66 via the camera module 5c. The user interface 64 can be a touch screen or a physical button. The user is able to interact with the user interface 64 and the image software processor 65 having multiple functions to capture images and complete image processing. The image processed by the image software processor 65 can be displayed on the user interface 64.

The smartphone in this embodiment is only exemplary for showing the imaging lens system of the present disclosure installed in an electronic device, and the present disclosure is not limited thereto. The imaging lens system can be optionally applied to optical systems with a movable focus. Furthermore, the imaging lens system features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system, having an optical axis, and the imaging lens system comprising:
   at least one optical element, wherein the at least one optical element comprises, in order from a center to a periphery thereof:
   a central portion, wherein the optical axis passes through the central portion, the central portion comprises a central opening structure, the central opening structure has a first tapered surface and a second tapered surface that surround the central portion, the first tapered surface faces an object side and is tapered off towards an image side, the second tapered surface faces the image side and is tapered off towards the object side, and the first tapered surface and the second tapered surface are connected to form a central opening; and
   an outer ring portion, wherein the outer ring portion surrounds the central portion, and the outer ring portion comprises, on at least one of an object side and an image side thereof:
   at least one annular groove structure, wherein the at least one annular groove structure is in a full-circle form, and the at least one annular groove structure is tapered off from the object side to the image side of the outer ring portion or from the image side to the object side of the outer ring portion;
   at least one flat abutting portion, wherein the at least one flat abutting portion is located closer to the central portion than the at least one annular groove structure, and the at least one flat abutting portion is in physical contact with another optical element which is adjacent to the at least one optical element of the imaging lens system; and
   at least one full-circle connecting portion, wherein the at least one full-circle connecting portion is connected to the at least one annular groove structure, the at least one full-circle connecting portion is located farther away from the central portion than the at least one annular groove structure, and the at least one full-circle connecting portion is exposed to air and is not in physical contact with the optical element and another optical element adjacent thereto;
   wherein the at least one annular groove structure has:
      an annular bottom end surface, extending in a direction substantially perpendicular to the optical axis;
      a first annular side wall, wherein the first annular side wall is connected to the annular bottom end surface and the at least one full-circle connecting portion, and the first annular side wall extends in a direction away from the annular bottom end surface; and
      a second annular side wall, wherein the second annular side wall is connected to the annular bottom end surface, the second annular side wall is located closer to the central portion than the annular bottom end surface, and the second annular side wall extends in a direction away from the annular bottom end surface;
   wherein a minimum diameter of the first annular side wall is $\Phi A1$, a maximum diameter of the second annular side wall is $\Phi A2$, a length of the annular bottom end surface in a direction perpendicular to the optical axis is $(\Phi A1-\Phi A2)/2$, and the following condition is satisfied:

$0.005 \text{ [mm]} \leq (\Phi A1-A2)/2 < 0.2 \text{ [mm]}$.

2. The imaging lens system of claim 1, wherein the minimum diameter of the first annular side wall is $\Phi A1$, the maximum diameter of the second annular side wall is $\Phi A2$, the length of the annular bottom end surface in the direction perpendicular to the optical axis is $(\Phi A1-\Phi A2)/2$, and the following condition is satisfied:

$0.01 \text{ [mm]} \leq (\Phi A1-\Phi A2)/2 < 0.17 \text{ [mm]}$.

3. The imaging lens system of claim 1, wherein the outer ring portion further comprises at least one conical surface located closer to the optical effective portion than the at least one annular groove structure, and the at least one optical element is correspondingly assembled with a plastic lens element adjacent thereto by the at least one conical surface to be aligned with the optical axis.

4. The imaging lens system of claim 1, further comprising at least one optical shutter plate, wherein the at least one optical shutter plate is disposed between the at least one optical element and a plastic lens element, and the at least one optical shutter plate has an opening being coaxial with the optical axis.

5. The imaging lens system of claim 1, wherein the outer ring portion further comprises at least one conical surface located closer to the optical effective portion than the at least one annular groove structure, and a maximum outer diameter of the at least one optical element is $\Phi L$, the minimum diameter of the first annular side wall is $\Phi A1$, the maximum diameter of the second annular side wall is $\Phi A2$, a maximum diameter of the at least one conical surface is $\Phi C$, and the following condition is satisfied:

$\Phi L > \Phi A1 > \Phi A2 \geq \Phi C$.

6. The imaging lens system of claim 1, wherein a maximum outer diameter of the at least one optical element is $\Phi L$, the minimum diameter of the first annular side wall is $\Phi A1$, the maximum diameter of the second annular side wall is $\Phi A2$, and the following condition is satisfied:

$1 < [\Phi L/(\Phi A1-\Phi A2)]/\pi^2 < 50$.

7. The imaging lens system of claim 1, wherein the outer ring portion of the at least one optical element has a gate trace, the gate trace is located farther away from the central portion than the at least one annular groove structure, and the gate trace is located farther away from the central portion than the at least one full-circle connecting portion.

8. The imaging lens system of claim 1, wherein the at least one optical element is at least one plastic lens element, the central portion is an optical effective portion, and the at least one full-circle connecting portion defines a depth of the at least one annular groove structure, and
   wherein a first distance in parallel with the optical axis between the at least one full-circle connecting portion and the annular bottom end surface is d, and the following condition is satisfied:

$0.005 \text{ [mm]} \leq d < 0.2 \text{ [mm]}$.

9. The imaging lens system of claim 8, wherein the first distance in parallel with the optical axis between the at least one full-circle connecting portion and the annular bottom end surface is d, and the following condition is satisfied:

0.01 [mm]≤$d$<0.13 [mm].

10. The imaging lens system of claim 8, wherein the outer ring portion further comprises at least one conical surface located closer to the optical effective portion than the at least one annular groove structure, and the at least one plastic lens element is correspondingly assembled with the optical element by the at least one conical surface to be aligned with the optical axis.

11. The imaging lens system of claim 8, wherein a second distance in parallel with the optical axis between the at least one flat abutting portion and the annular bottom end surface is D, and the following condition is satisfied:

0.05 [mm]<$D$<0.4 [mm].

12. The imaging lens system of claim 9, wherein the first distance in parallel with the optical axis between the at least one full-circle connecting portion and the annular bottom end surface is d, a second distance in parallel with the optical axis between the at least one flat abutting portion and the annular bottom end surface is D, and the following condition is satisfied:

0.02<$d/D$<1.0.

13. The imaging lens system of claim 8, further comprising at least one optical shutter plate, wherein the at least one optical shutter plate is disposed between the at least one plastic lens element and another plastic lens element adjacent to an image side of the at least one optical shutter plate, and the at least one optical shutter plate has an opening being coaxial with the optical axis.

14. The imaging lens system of claim 13, wherein the at least one plastic lens element adjacent to an object side of the at least one optical shutter plate has a first conical surface, the another plastic lens element adjacent to the image side of the at least one optical shutter plate has a second conical surface, the first conical surface and the second conical surface are correspondingly assembled with each other and form an accommodation space between the at least one plastic lens element and the another plastic lens element, and the at least one optical shutter plate is disposed in the accommodation space.

15. The imaging lens system of claim 14, wherein a maximum outer diameter of the at least one optical shutter plate is ΦS, a minimum diameter of the first conical surface is ΦC', and the following condition is satisfied:

Φ$S$≤Φ$C'$.

16. The imaging lens system of claim 12, wherein a projection of the second distance on the optical axis has at least one part non-overlapping with a projection of the first distance on the optical axis, a third distance in parallel with the optical axis between the at least one flat abutting portion and the at least one full-circle connecting portion is D–d, and the following condition is satisfied:

0 [mm]<$D-d$<0.39 [mm].

17. The imaging lens system of claim 8, wherein the outer ring portion of the at least one plastic lens element has a gate trace, the gate trace is located farther away from the optical effective portion than the at least one annular groove structure, and the gate trace is located farther away from the optical effective portion than the at least one full-circle connecting portion.

18. A camera module, comprising:
 the imaging lens system of claim 8; and
 an image sensor disposed on an image surface of the imaging lens system.

19. An electronic device, comprising:
 the camera module of claim 18.

* * * * *